(12) United States Patent
Mitome

(10) Patent No.: US 8,345,980 B2
(45) Date of Patent: Jan. 1, 2013

(54) IMAGE PROCESSING APPARATUS, IMAGE PROCESSING METHOD, AND COMPUTER-READABLE STORAGE MEDIUM TO DETERMINE WHETHER A MANUSCRIPT IS AN ORIGINAL BY USING PAPER FINGERPRINT INFORMATION

(75) Inventor: Aya Mitome, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/159,615

(22) Filed: Jun. 14, 2011

(65) Prior Publication Data

US 2011/0243400 A1    Oct. 6, 2011

Related U.S. Application Data

(62) Division of application No. 11/772,898, filed on Jul. 3, 2007, now abandoned.

(30) Foreign Application Priority Data

Jul. 6, 2006  (JP) ................................ 2006-187002
May 31, 2007 (JP) ................................ 2007-145744

(51) Int. Cl.
*G06K 9/00*     (2006.01)
*G06K 9/46*     (2006.01)
*G06K 9/66*     (2006.01)
*B42D 15/00*    (2006.01)

(52) U.S. Cl. ........... 382/181; 382/100; 382/195; 283/72

(58) Field of Classification Search .................. None
See application file for complete search history.

(56) References Cited

U.S. PATENT DOCUMENTS

| 5,680,221  | A  * | 10/1997 | Takano ........................ 358/296 |
| 6,766,056  | B1   | 7/2004  | Huang et al. |
| 6,842,863  | B1 * | 1/2005  | Fox et al. .......................... 726/5 |
| 7,630,559  | B2 * | 12/2009 | Ito et al. ........................ 382/209 |
| 2004/0021549 | A1 | 2/2004 | Choi |
| 2006/0202468 | A1* | 9/2006 | Phillips et al. .................. 283/72 |
| 2008/0116277 | A1* | 5/2008 | Tomita ..................... 235/462.11 |
| 2008/0267511 | A1* | 10/2008 | Bourrieres et al. ........... 382/209 |

FOREIGN PATENT DOCUMENTS

| JP | 8-147400    | 6/1996 |
| JP | 11-195079   | 7/1999 |
| JP | 2004-503880 | 2/2004 |
| JP | 2004-112644 | 4/2004 |
| JP | 2006-166207 | 6/2006 |

OTHER PUBLICATIONS

Japanese Official Action dated Jun. 29, 2010, issued by the Japanese Patent Office in Japanese Application No. 2007-145744.
Ito et al., "Paper Document Security," Fuji Xerox Technical Report No. 15,2005 (w/English Abstract).

* cited by examiner

*Primary Examiner* — Tom Y Lu
*Assistant Examiner* — Thomas Conway
(74) *Attorney, Agent, or Firm* — Fitzpatrick, Cella, Harper & Scinto

(57) ABSTRACT

According to the present invention, authenticities of paper fingerprint information and of document information are collectively determined through formation of an original that is given an encoded image in which both paper fingerprint information and document information are encoded. By collectively guaranteeing identities of the paper form and of the document, it becomes possible to realize the more reliable authenticity guarantee.

9 Claims, 28 Drawing Sheets

IMAGE PROCESSING APPARATUS, IMAGE PROCESSING METHOD, AND COMPUTER-READABLE STORAGE MEDIUM TO DETERMINE WHETHER A MANUSCRIPT IS AN ORIGINAL BY USING PAPER FINGERPRINT INFORMATION

This application is a divisional of U.S. patent application Ser. No. 11/772,898, filed Jul. 3, 2007, now pending.

BACKGROUND OF THE INVENTION

1. Field of the Invention

This invention relates to an image processing apparatus, an image processing method, and a storage medium that can handle a paper fingerprint.

2. Description of the Related Art

In recent years, it has become possible to duplicate securities and certificate papers that cannot be distinguished from originals. Moreover, on the other hand, there are increasing situations scenes in which the contents of the securities and certificate documents are made electronic and they are printed and allowed to be used. Thus, the need to guarantee authenticity That is, needs and opportunities of guaranteeing authenticities of documents is are increasing.

Japanese Patent Laid-Open No. 2004-112644 discloses an identity assurance technique of a paper form by means of a paper fingerprint. A technique disclosed in Japanese Patent Laid-Open No. 2004-112644 is to add a mark on the paper form and read a paper fingerprint of the paper form using the mark as a reference. Further, the read paper fingerprint is converted to an encoded image, and the encoded image is outputted on the above-mentioned paper form to form a printed matter.

When a third person who receives received the formed printed matter wishes to check "whether the printed matter is made from the above-mentioned paper form", the paper fingerprint of the printed matter is read using the mark as the reference and the read paper fingerprint is compared with a paper fingerprint in the encoded image. If the comparison result shows that the read paper fingerprint matches the paper fingerprint in the encoded image, it is possible to confirm will be able to check that the printed matter is surely a paper form that was used at the time of forming the encoded image.

Japanese Patent Laid-Open No. H11-195079 and Japanese Patent Laid-Open No. H8-147400 disclose a technique of guaranteeing the identity of document information. The technique disclosed in Japanese Patent Laid-Open No. H11-195079 and Japanese Patent Laid-Open No. H8-147400 is such that a part of the document information is converted to a bar code and the bar code after conversion and the document information are combined and outputted on a paper form, forming a printed matter.

When a person who receives received the formed printed matter wishes to check whether the printed matter is made from the above-mentioned paper form, the paper fingerprint of the printed matter is read using the code as a reference and the read paper fingerprint and the paper fingerprint in the encoded image are compared. When the comparison result shows that the read paper fingerprint matches the paper fingerprint in the encoded image, it is possible to confirm will be able to be checked that the above-mentioned printed matter is surely a paper form being used when the encoded image is formed.

SUMMARY OF THE INVENTION

However, although the technique disclosed in Japanese Patent Laid-Open No. 2004-112644 can determine identity of the paper form with the help of the paper fingerprint, it cannot be determined whether the printed matter is an original. The reason of this is that the identity of the document information cannot be guaranteed.

Moreover, although the technique disclosed in Japanese Patent Laid-Open No. H11-195079 and Japanese Patent Laid-Open No. H8-147400 can determine the identity of the document information, it cannot determine whether a manuscript is the original. The reason of this is that the identity of the paper form cannot be guaranteed.

This invention is made in view of such a problem, and has as its object to provide an image processing apparatus, a method of controlling the image processing apparatus, a program, and a storage medium that can determine whether the manuscript is the original.

In order to solve the above-mentioned problem, this invention provides an image processing apparatus, having: first acquisition means for acquiring paper fingerprint information from a paper fingerprint acquisition area on a paper form that serves as for the original; second acquisition means for acquiring the document information from a document information acquisition area on the paper form that serves as for the original; encoded image generation means for generating an encoded image; and output means for outputting an encoded image generated by the encoded image generation means, wherein the encoded image generated by the encoded image generation generating means is an image from which the that is used to later acquire paper fingerprint information acquired by the first acquisition means and the document information acquired by the second acquisition means can later be extracted.

According to the present invention, an image processing apparatus that can determine whether the manuscript is the original can be provided.

Further features of the present invention will become apparent from the following description of exemplary embodiments with reference to the attached drawings.

DESCRIPTION OF THE EMBODIMENTS

Below, the best forms for carrying out the present invention will be described with reference to the drawings.

First Embodiment

<Image Processing System>

Figure 1:
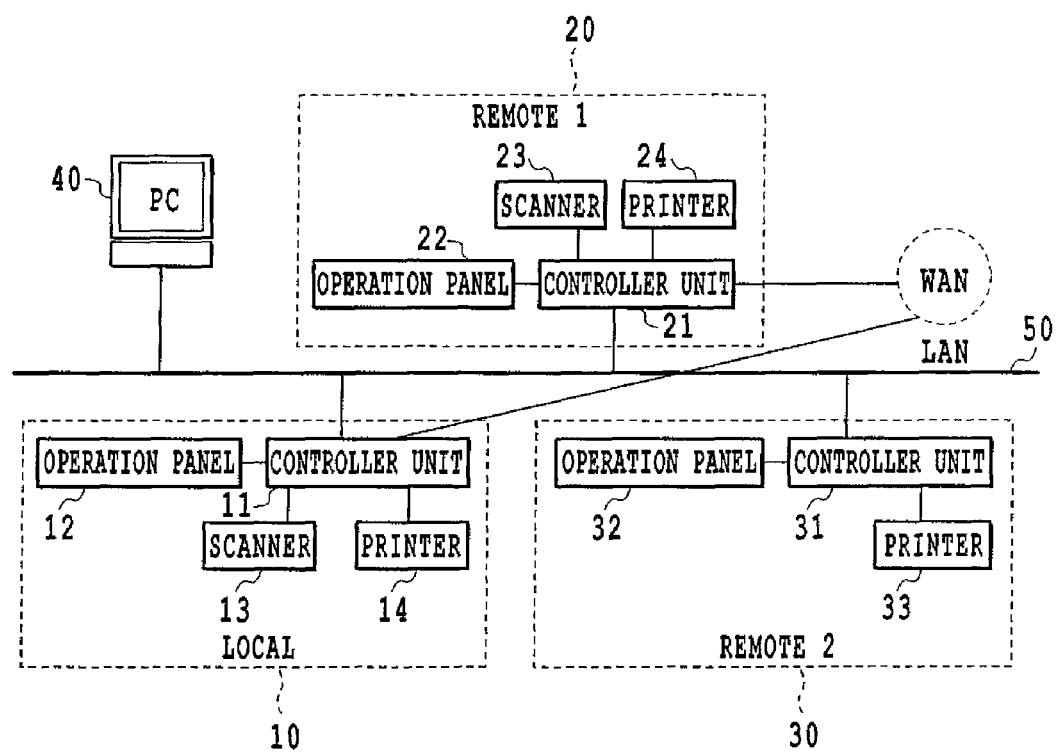
FIG. 1 is a block diagram showing an image processing system according to one embodiment of the present invention.

FIG. 1 is a block diagram showing an image processing system according to the present invention. Although in this diagram, in order to illustrate the system, one host computer 40 and three image formation apparatuses 10, 20, and 30 are connected to a LAN 50, the number of these elements is not limited to these numbers in the image processing system according to the present invention. Moreover, although the LAN is applied to this embodiment as a connection method, the connection method is not limited to this. For example, an arbitrary network, such as WAN, can also be applied. Furthermore, serial transmission systems, such as US, and parallel transmission systems, such as Centronics and SCSI, are applicable to this image processing system.

The host computer (hereinafter referred to as PC) 40 has functions of a personal computer. This PC 40 can transmit and receive a file using the FTP or SMB protocol through the LAN 50 or WAN. Moreover, the PC 40 can issue a print instruction to the image formation apparatuses 10, 20, and 30 through a printer driver.

In this embodiment, the image formation apparatuses 10 and 20 have the same constituents. The image formation apparatus 30 is an image formation apparatus only with a printing function and does not have the scanner unit that the image formation apparatuses 10, 20 have. In the below, in order to simplify explanation, the image formation apparatus 10 is focused and its details will be explained.

The image formation apparatus 10 has a scanner 13 acting as an image input device, a printer unit acting as an image output device, a controller unit 11 for controlling the whole operation of the image formation apparatus 10, and an operation panel 12 acting as a user interface.

The image formation apparatus 20 has a scanner 23 acting as an image input device, a printer unit acting as an image output device, a controller unit 21 for controlling the whole operation of the image formation apparatus 20, and an operation panel 22 acting as a user interface.

A printer 24 is an image forming device that forms an image of the image data received from the controller unit 21 on a paper form.

The image formation apparatus 30 has a printer unit acting as an image output device, a controller unit 31 for controlling the whole operation of the image formation apparatus 30, and an operation panel 32 acting as a user interface.

A printer 33 is an image forming device that forms an image of the image data received from the controller unit 31 on a paper form.

<Image Formation Apparatus 10>

Figure 2:
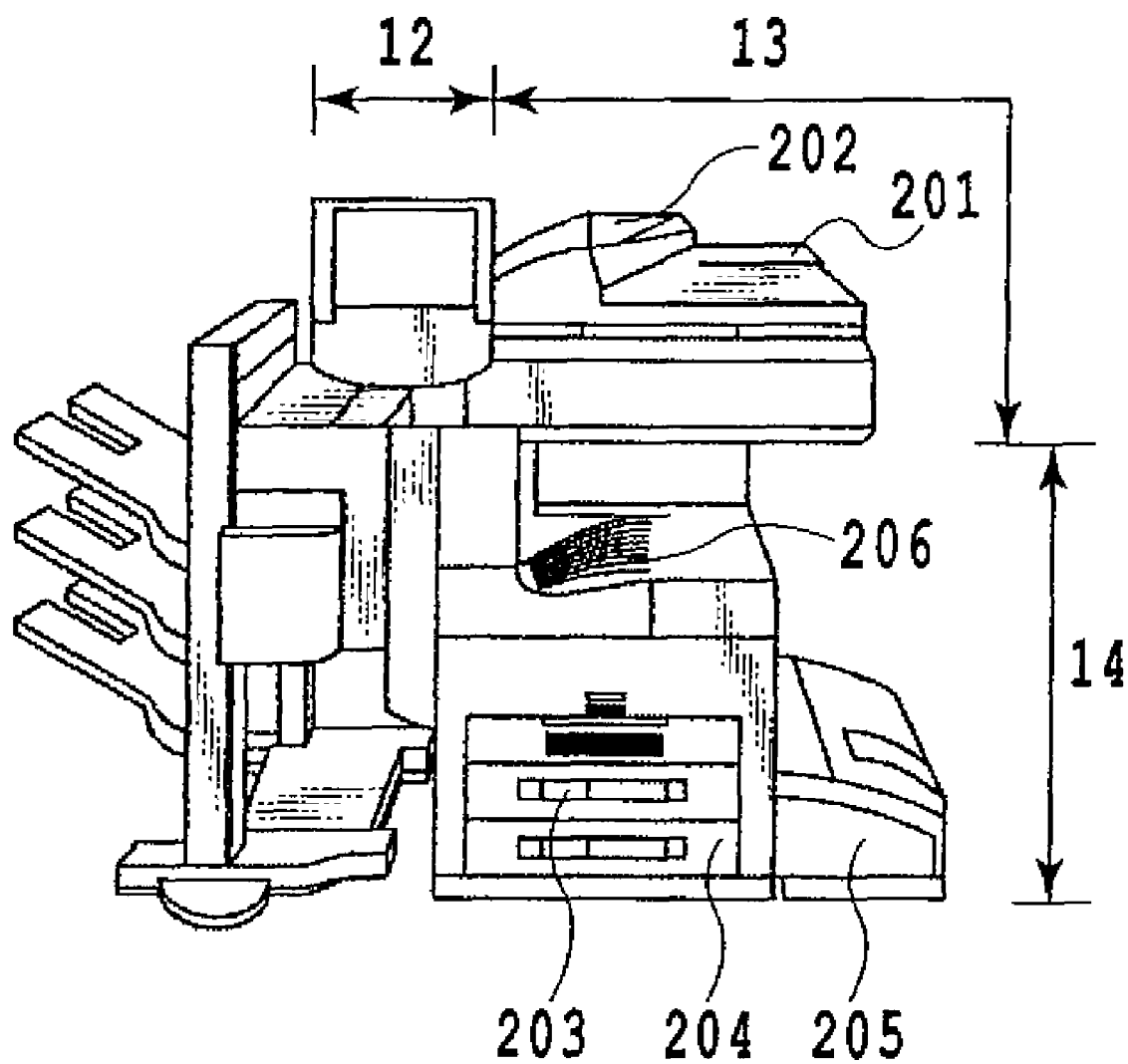
FIG. 2 is an appearance diagram of the image formation apparatus according to the one embodiment of the present invention.

FIG. 2 is a diagram showing an appearance of the image formation apparatus 10.

The scanner 13 has a plurality of CCD's. If each of these CCD's has different sensitivity, even when the densities of respective pixels on a manuscript are the same, the each pixel will be considered to have a different density. Therefore, the scanner unit scans with light a white board (uniformly white plate), converts the amount of reflected light obtained by scanning with light into an electric signal, and outputs it to the controller unit 11. As will be described later, a shading correction unit 500 in the controller unit 11 recognizes the difference in sensitivity among the CCD's based on electrical signals obtained from the respective CCD's. Subsequently, the value of the electrical signal obtained by scanning the image on the manuscript is corrected using this recognized difference in sensitivity. Moreover, upon reception of information of gain adjustment from a CPU 301 in the controller unit 11, the shading correction unit 500 performs gain adjustment according to the information, as will be described later. The gain adjustment is used to adjust how a value of an electrical signal obtained by scanning with light the manuscript is assigned to luminance signal values ranging from 0 to 255. This gain adjustment enables a value of the electric signal obtained by scanning with light the manuscript to be converted to a high luminance signal value or to a low luminance signal value.

Next, scanning an image on the manuscript will be explained.

The scanner 13 converts information of an image into electrical signals by inputting reflected light obtained by scanning with light an image on the manuscript into the CCD's. Further, the scanner 13 converts the electrical signals into luminance signals consisting of R (red), G (green), and B (blue) colors, and outputs the luminance signals to the controller unit 11 as image data. Incidentally, the manuscript is set on a tray 202 of a manuscript feeder 201.

When a user instructs read the start in of reading using the operation panel 12, the controller unit 11 gives provides a manuscript read instruction to the scanner 13. Upon reception of this instruction, the scanner 13 feeds the manuscript from the tray 202 of the manuscript feeder 201 one by one and performs a reading operation of the manuscript. Note that the method of reading the manuscript may be a method of scanning the manuscript by placing the manuscript on an unillustrated glass surface and moving the exposure unit rather than the automatic feeding method by the manuscript feeder 201.

A printer 14 is an image forming device that forms an image of the image data received from the controller unit 11 on a paper form. Note that although, in this embodiment, the image formation method is an electrophotography method using a photosensitive drum or photosensitive belt, the present invention is not limited to this. For example, the ink jet method whereby printing is performed on a paper form by discharging ink from a minute nozzle array is also applicable. Moreover, the printer 14 is provided with two or more paper form cassettes 203, 204, and 205 that enable different paper form sizes or different paper form orientations to be selected. The paper form after printing is discharged into the paper output tray 206.

<Controller Unit 11>

Figure 3:
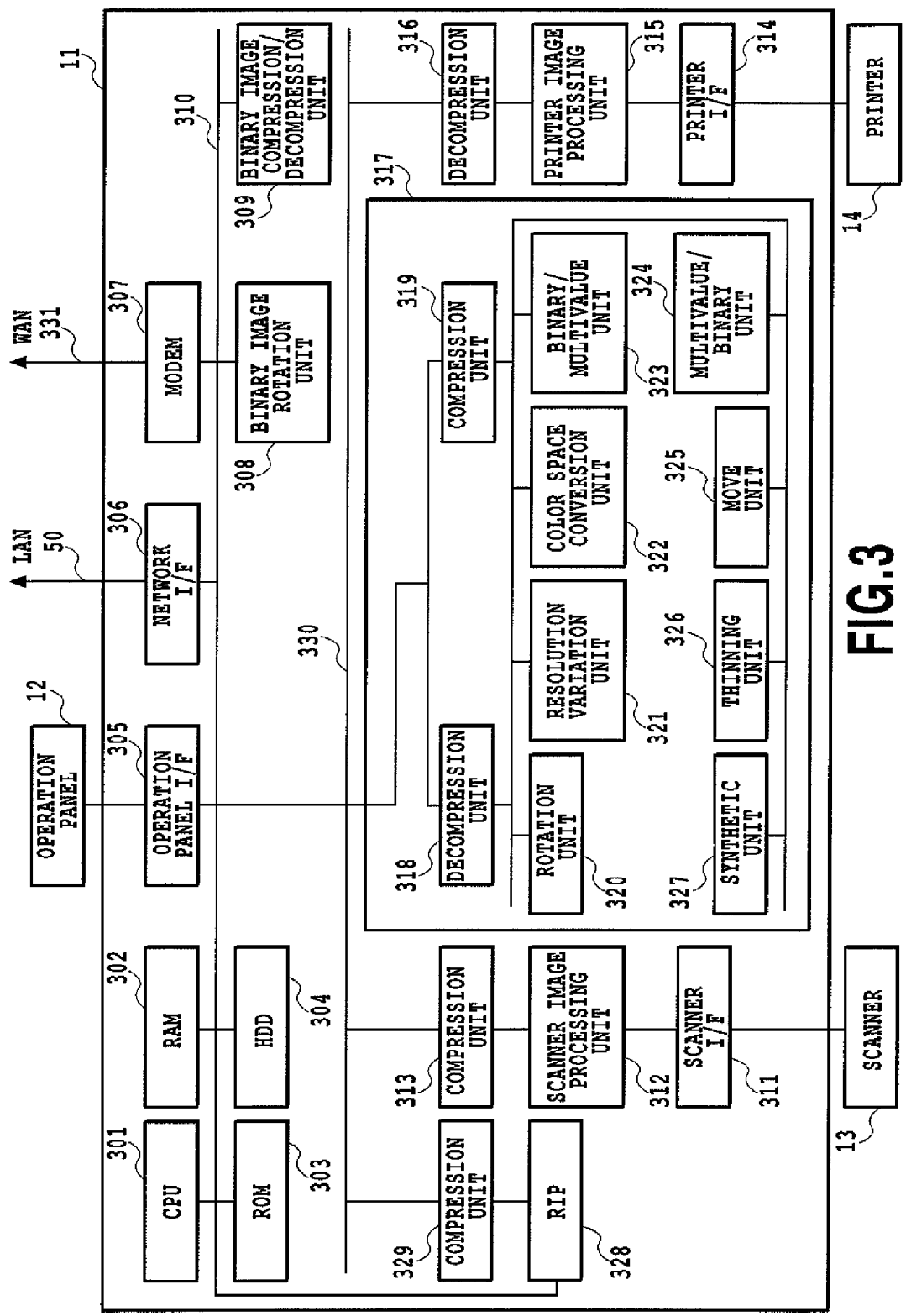
FIG. 3 is a block diagram showing a controller provided in the image formation apparatus according to the one embodiment of the present invention.

FIG. 3 is a block diagram showing a controller unit 11 provided in the image formation apparatus 10.

The controller 11 is electrically connected with the scanner 13 and the printer 14, and, on the other hand, is connected with the PC 40, external apparatuses, etc. through the LAN 50 or WAN 331. This connection enables the image data and device information to be inputted thereinto and outputted therefrom.

The CPU 301 controls accesses access to various connected devices under connection based on a control program stored in ROM 303 etc. in an integrated manner, and also controls various processing performed inside the controller in an integrated manner. RAM 302 is system work memory for enabling the CPU 301 to operate, and is also memory for temporarily storing the image data. This RAM 302 has SRAM that retains stored contents even after a power supply is turned OFF and DRAM whose stored contents are erased after a power supply is turned OFF. The ROM 303 stores a boot program of the apparatus etc. A HDD 304 is a hard disk drive that is made capable of storing system software and the image data.

An operation panel I/F 305 is an interface unit for connecting a system bus 310 and the operation panel 12. This operation panel I/F 305 receives the image data to be displayed on the operation panel 12 from the system bus 310, outputs it to the operation panel 12, and outputs information entered from the operation panel 12 to the system bus 310.

A network I/F 306 is an interface unit for connecting the system bus 310 and the LAN 50. A modem 307 is an interface unit for connecting the system bus 310 and the WAN 331. A binary image rotation unit 308 converts a direction of the image data before transmission. A binary image compression/decompression unit 309 converts the resolution of the image data before the transmission into predetermined resolution or resolution that matches a throughput of a transmission destination. Incidentally, in compression and decompression, a method of JBIG, MMR, MR, MH, or the like is used. An image bus 330 is a transmission line for exchanging the image data, and has a PCI bus or IEEE1394.

A scanner image processing unit 312 performs correction, processing, and editing on the image data received from the scanner 13 through a scanner I/F 311. Moreover, the scanner image processing unit 312 makes the following determinations: whether the received image data is a color manuscript or monochrome manuscript; whether the received image data is a character manuscript or photograph manuscript; and the like; and makes the determination result accompany the image data. Such accompanying information is called attribute data. The processing performed in this scanner image processing unit 312 will be explained more in detail later.

The compression unit 313 receives the image data and divides this image data into blocks (32×32 pixels). Incidentally, this data of 32×32 pixels is called tile data.

Figure 4:
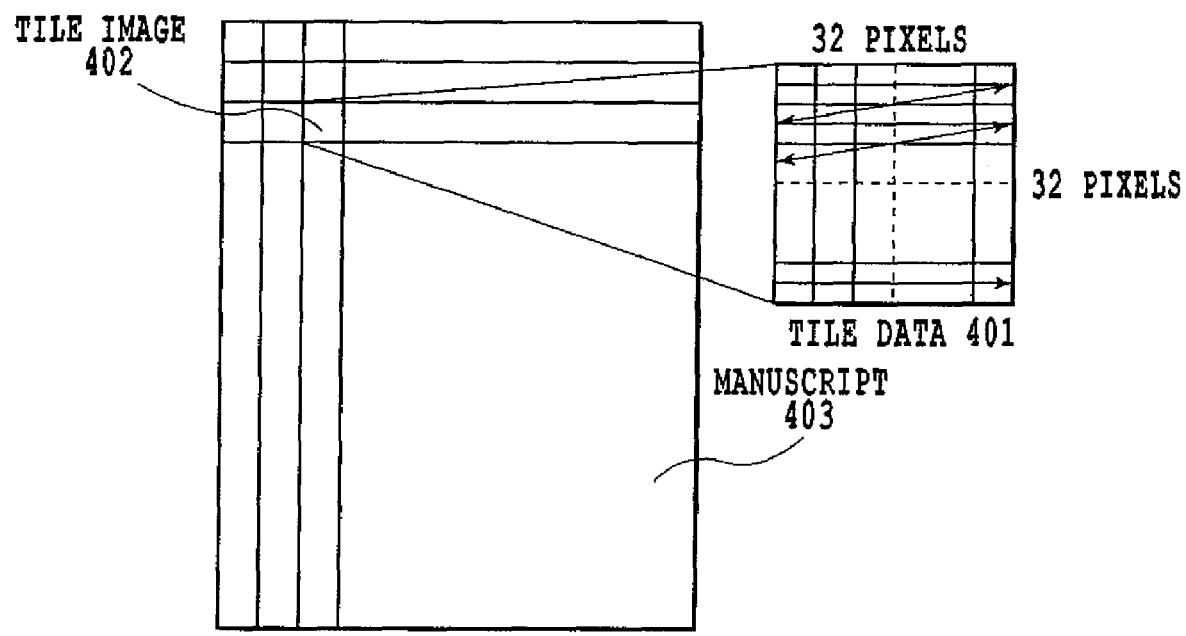
FIG. 4 is a diagram conceptually showing tile data.

FIG. 4 is a diagram conceptually showing tile data 401. In a manuscript (paper medium before reading) 403, an area corresponding to this tile data 401 is called a tile image 402. The tile data 401 is given average luminance information in a block of 32×32 pixels and a coordinate position of the tile image 402 on the manuscript 403 as its header information. The compression unit 313 compresses the image data consisting of a plurality of tile data. The decompression unit 316 decompresses the image data consisting of a plurality of tile data, subsequently puts it under raster development, and sends the rendered data to a printer image processing unit 315.

The printer image processing unit 315 receives the image data from the decompression unit 316, and performs image processing on the image data, while referring to the attribute data accompanying this image data. The image data after image processing is outputted to the printer 14 through a printer I/F 314. The processing performed in this printer image processing unit 315 will be explained more in detail later.

An image conversion unit 317 has a processing unit explained below, and performs predetermined conversion processing on the image data.

A decompression unit 318 decompresses the received image data. A compression unit 319 compresses the received image data. A rotation unit 320 rotates the received image data. A resolution variation unit 321 converts resolution of the received image data (for example, the resolution is converted from 600 dpi to 200 dpi). A color space conversion unit 322 converts a color space of the received image data. This color space conversion unit 322 can perform the following: the well-known ground elimination processing using a matrix or table; the well-known Log conversion processing (RGB→CMY); the well-known output color correction processing (CMY→CMYK); and the like. A binary/multivalue conversion unit 323 converts the image data of two tones into image data of 256 tones. Conversely, a multivalue/binary conversion unit 324 converts the received image data of 256 tones into image data of two tones with a technique, such as error diffusion.

A synthetic unit 327 generates one piece of image data by synthesizing two pieces of the image data received. Incidentally, in synthesizing two pieces of the image data, there can be used either a method of setting an average of the luminance values held by pixels that are targets of synthesis as a synthesized luminance value or a method of setting a luminance value of a pixel brighter in luminance level as a luminance value of the pixel after the synthesis. Moreover, a method of setting the luminance value of a darker pixel to the luminance value of a pixel after synthesis can also be applied. Furthermore, a method of determining the luminance value after the synthesis by an OR operation of the pixels targeted for the synthesis, an AND operation, an exclusive OR operation, etc. can also be applied. Any of these synthetic methods is the well-known technique. A thinning unit 326 performs resolution conversion by thinning out pixels of the received image data, and generates image data of resolution of the initial value multiplied by ½, ¼, ⅛, etc. A move unit 325 attaches a margin part to the received image data, or deletes a margin part therefrom.

An RIP 328 receives intermediate data that a compression unit 329 generates based on the PDL code data transmitted for the PC 40 etc. and generates bit map data (multivalued).

<Scanner Image Processing Unit 312>

Figure 5:
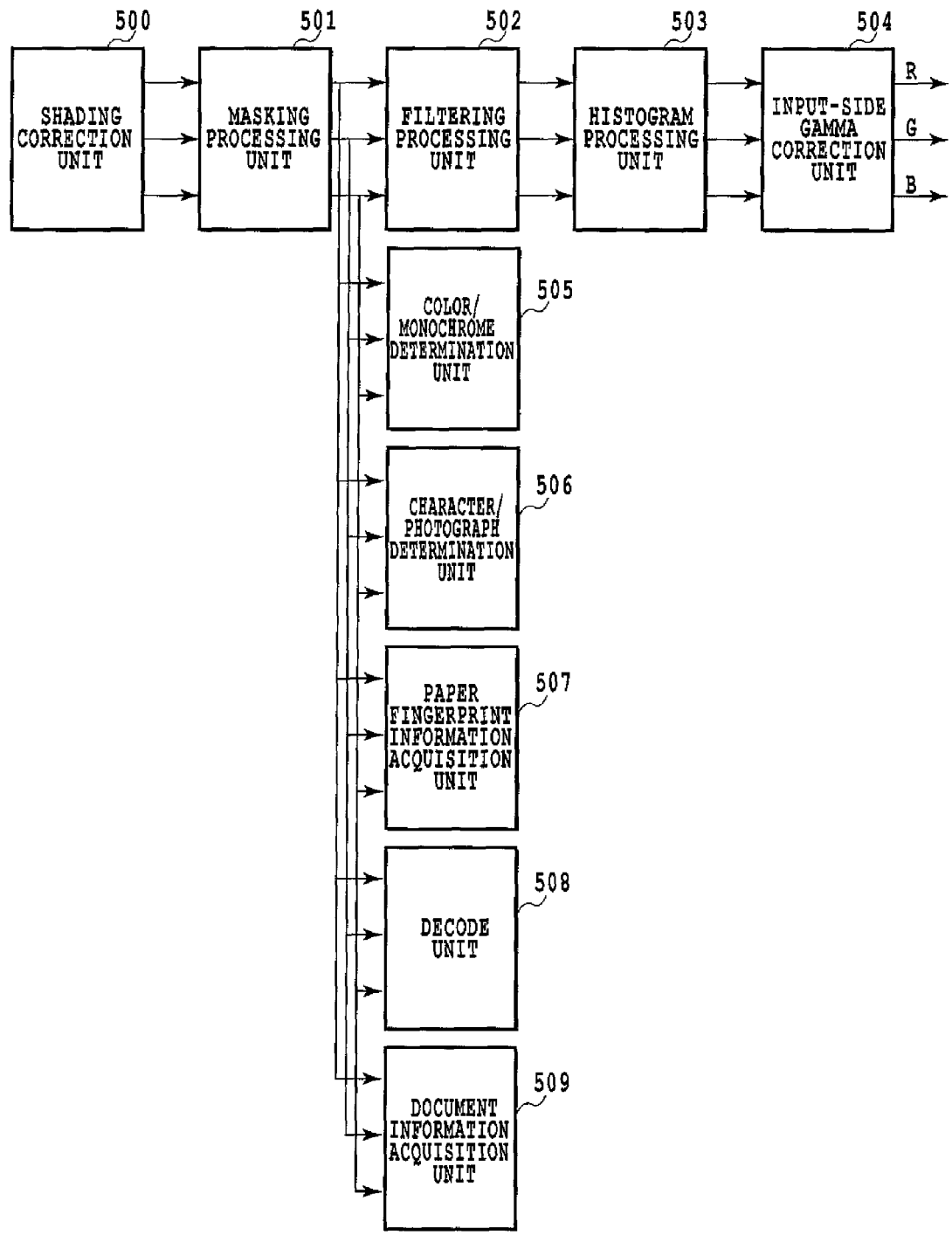
FIG. 5 is a block diagram of a scanner image processing unit.

FIG. 5 is a diagram showing the inside of the scanner image processing unit 312.

The scanner image processing unit 312 receives the image data consisting of luminance signals of RGB each of 8 bits.

The shading correction unit 500 performs shading compensation on these luminance signals. The shading compensation is processing of preventing the luminosity of the manuscript from being incorrectly recognized due to variation in sensitivity of CCD, as described above. Further, as described above, this shading correction unit 500 can perform a gain adjustment by an instruction from the CPU 301. Next, a masking processing unit 501 converts this luminance signal into a standard luminance signal that does not depend on filter colors of the CCD.

A filtering processing unit 502 corrects the spatial frequency of the received image data arbitrarily. This filtering processing unit 502 performs arithmetical processing on the received image data using a matrix of 7×7, for example. Note here that the copier and the compound machine enable the user to select a character mode, a photograph mode, or a character/photograph mode by pressing a tab 704 in FIG. 7. Here, when the user selects the character mode, the filtering processing unit 502 imposes a filter for characters on the whole image data. When the user selects the photograph mode, the filtering processing unit 502 imposes a filter for photographs on the whole image data. Moreover, when the user selects a character/photograph mode, the filtering processing unit 502 adaptively changes a filter for each pixel according to the later-described character/photograph determination signal (a part of the attribute data). That is, on a pixel basis, it is determined whether the filter for photographs or the filter for characters is imposed. Note that, in the filter for photographs, coefficients for smoothing only high-frequency components are set up. This is for not highlighting roughness of the image. Moreover, in the filter for characters, coefficients for performing intense edge enhancement are set up. This is for enhancing sharpness of characters.

A histogram processing unit 503 samples luminance data of pixels of the received image data. Giving more detailed explanation of it, the luminance data in a rectangular area defined by a start point and an end point in a main scanning direction and in a sub-scanning direction is sampled with constant pitches in the main scanning direction and in the sub-scanning direction. Then, the histogram processing unit 503 generates histogram data based on the sampling results. The generated histogram data is used to estimate a ground level in performing ground elimination processing. An input-side gamma correction unit 504 converts the luminance data of each pixel into luminance data that has a nonlinear characteristic using a table etc.

A color/monochrome determination unit 505 determines whether each pixel of the received image data is of chromatic color or colorless, and makes the determination result accompany the image data as a color/monochrome determination signal (a part of the attribute data).

A character/photograph determination unit 506 determines whether each pixel in the image data is a pixel of characters, a pixel of a halftone dot, a pixel of a character in halftone dots, or a pixel in a solid image, based on a pixel value of the pixel in concern and pixel values of surrounding pixels. Incidentally, a pixel that applies to none of them is a pixel of a white area. Then, the character/photograph determination unit 506 makes the determination result accompany the image data as a character/photograph determination signal (a part of the attribute data). A paper fingerprint information acquisition unit 507 acquires image data of a predetermined area in the image data of RGB inputted into the shading correction unit 500.

Figure 8:
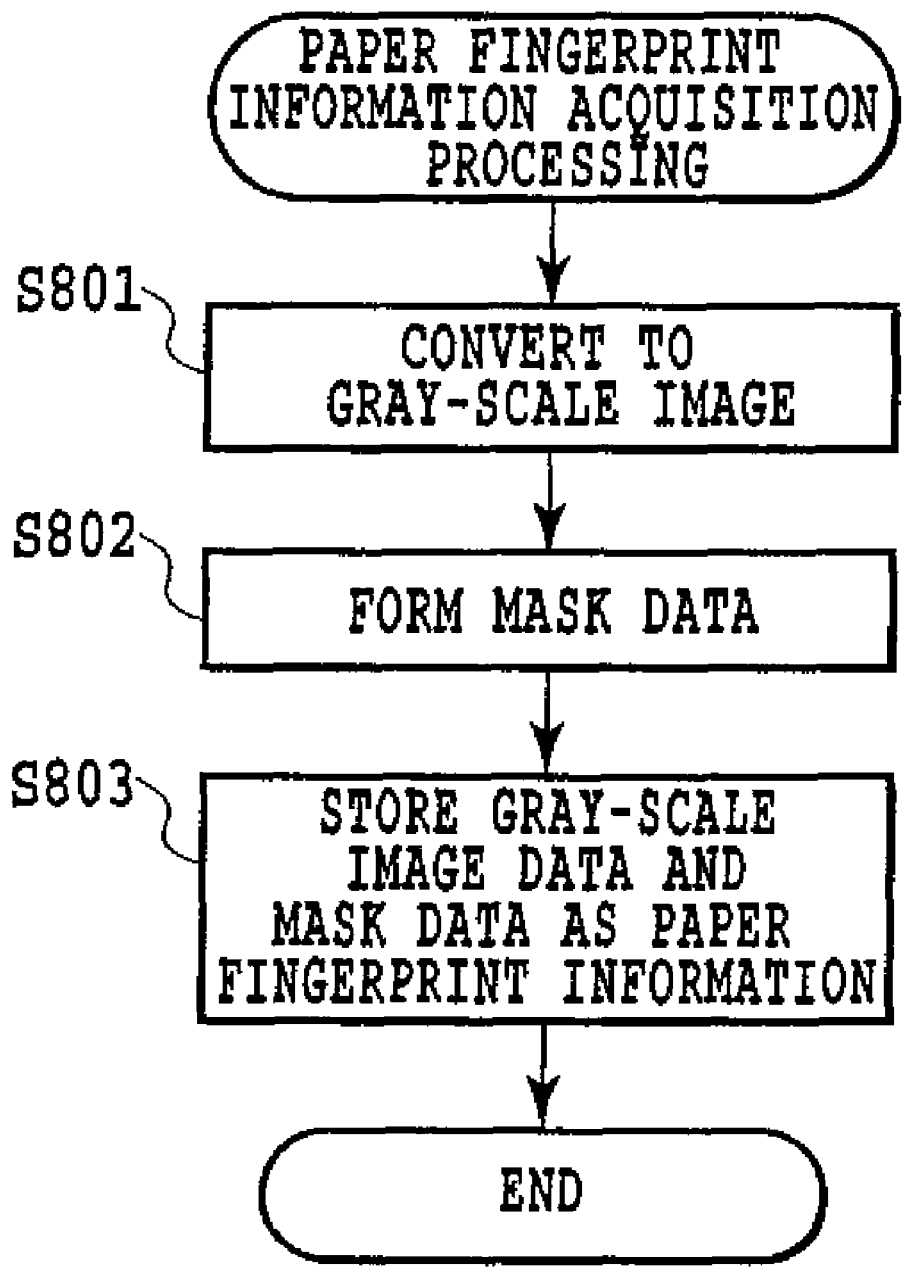
FIG. 8 is a flowchart of paper fingerprint information acquisition processing.

FIG. 8 is a flowchart showing a flow of paper fingerprint information acquisition processing that this paper fingerprint information acquisition unit 507 performs.

Figure 10:
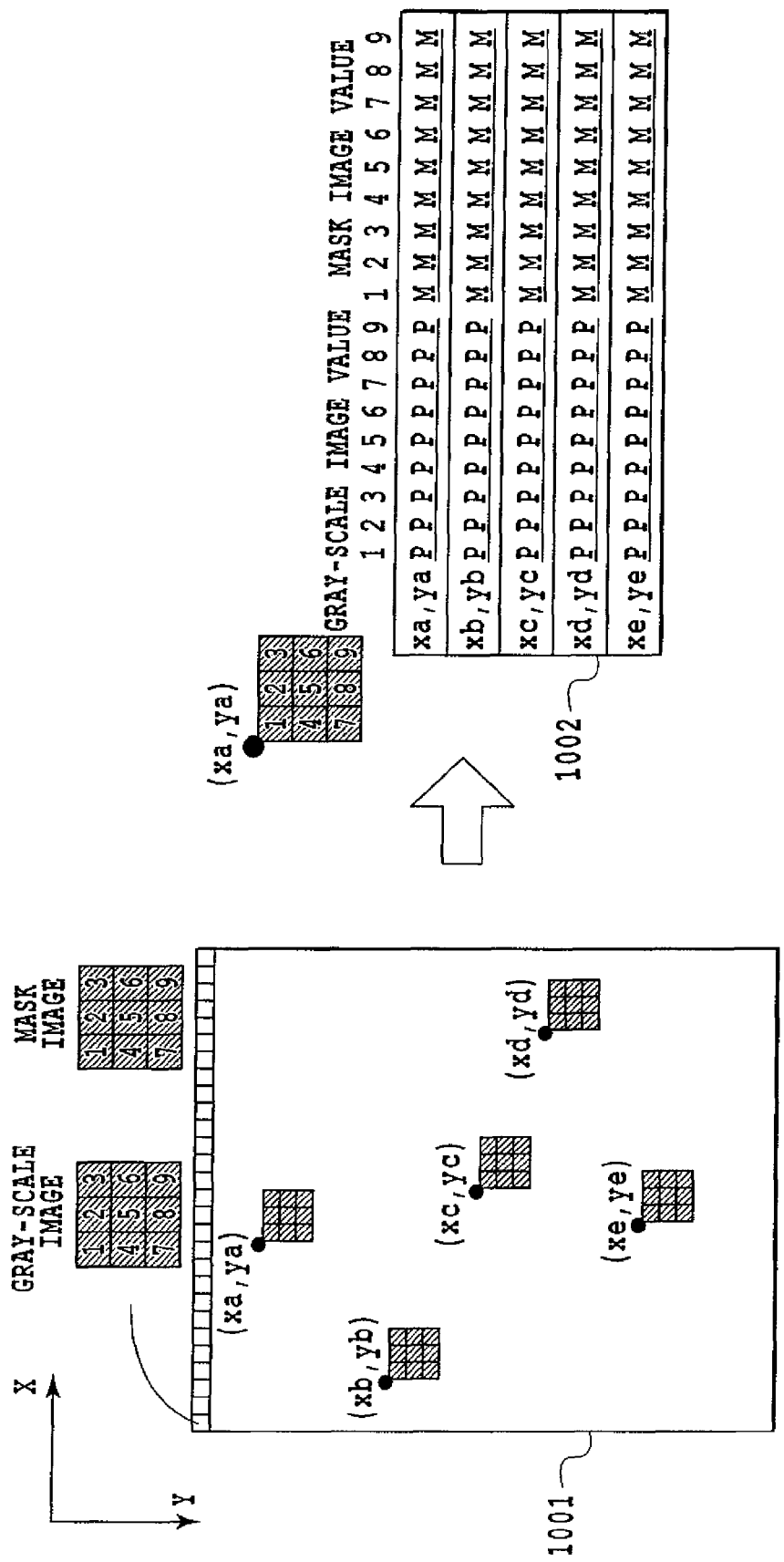
FIG. 10 is a diagram showing an example of acquired paper fingerprint information.

In Step S801, the image data extracted in the paper fingerprint information acquisition unit 507 is converted to image data of a gray scale. In Step S802, mask data that allows collation is formed by removing a possible factor of incorrect determination, such as printing and hand-writing characters, from the image having been converted to the image data of a gray scale in Step S801. The mask data is binary data, "0" or "1". In the image data of the gray scale, for any pixel whose luminance signal value is more than or equal to the first threshold (namely, being bright), a value of the mask data is set to "1". For any pixel whose luminance signal value is less than the first threshold, a value of the mask data is set to "0". The above processing is performed on all the pixels included in the image data of the gray scale to form the mask data. In Step S803, the image data converted to the gray scale in Step S801 and the mask data generated in Step S802 are acquired as paper fingerprint information together with the position information. FIG. 10 is a diagram showing an example of the acquired paper fingerprint information. Paper fingerprint information 1002 includes a pixel value (P) of the gray-scale image, a pixel value (M) of the mask data, and position information that are acquired from image data 1001. Subsequently, the paper fingerprint information acquisition unit 507 sends the paper fingerprint information of the above-mentioned predetermined area to the RAM 302 using an unillustrated data bus. Moreover, the acquired paper fingerprint information can also be stored in the HDD 304.

Figure 11:
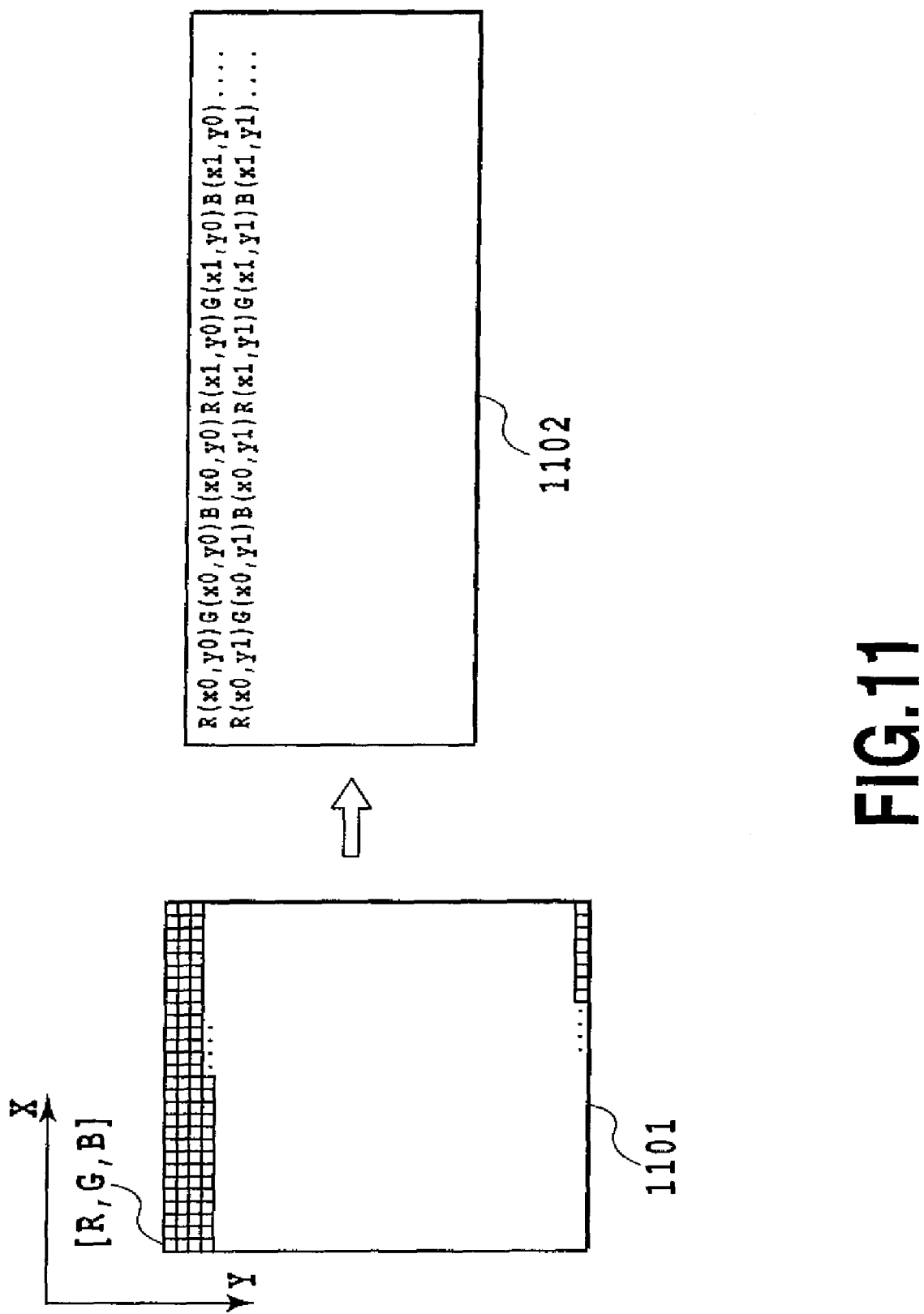
FIG. 11 is a diagram showing an example of acquired document information.

A document information acquisition unit 509 acquires the image data outputted from the masking processing unit 501 as document information. FIG. 11 is a diagram showing an example of the acquired document information. Document information 1102 is generated based on image data 1101.

In this specification, it is assumed that the document information is the image data of the whole manuscript. Incidentally, there is no specific restriction on a format of this image data. For example, it may be a PDL data format, a bit map data format, or a JPEG data format.

Moreover, the document information may be image data in a partial area of the manuscript image. Anyway, it is set beforehand "to which area of the manuscript image the document information corresponds" and "in which format the data is represented", and these pieces of information are shared among a plurality of apparatuses. More specifically, the information is shared among the apparatuses through a network, or information to be shared is included in the encoded image so that information is shared through the encoded image, or the like. Moreover, there is a case where the information to be shared is stored in a server and the information is shared through this server.

Subsequently, the document information acquisition unit 509 sends the above-mentioned document information to the RAM 302 using an unillustrated data bus. Moreover, the unit 509 can store the acquired document information in the HDD 304.

When the encoded image data exists in the image data outputted from the masking processing unit 501, a decode unit 508 detects its existence, and takes out the information by decoding the encoded image data. That is, the decode unit 508 extracts the paper fingerprint information and document information that served as a generation sources of the encoded image data.

<Printer Image Processing Unit 315>

Figure 6:
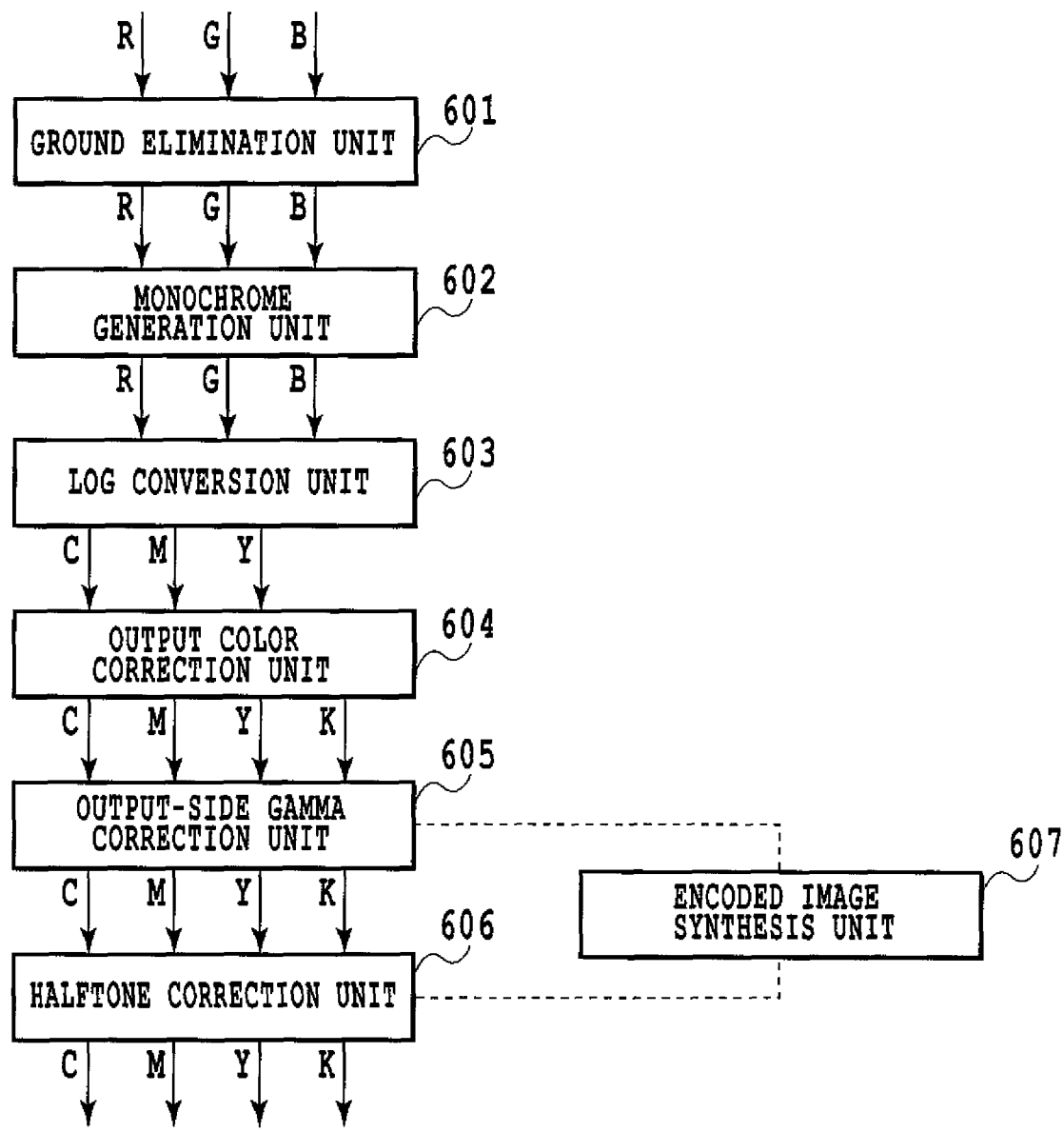
FIG. 6 is a block diagram of a printer image processing unit.

FIG. 6 is a block diagram of the printer image processing unit 315.

A ground elimination unit 601 eliminates aground color of the image data using a histogram generated in the scanner image processing unit 312. A monochrome generation unit 602 converts color data into monochrome data. A Log conversion unit 603 performs luminance density conversion. This Log conversion unit 603 converts, for example, the image data inputted with RGB values into image data with CMY values. An output color correction unit 604 performs output color correction. This output color correction unit 604 converts, for example, the image data inputted with CMY values into image data with CMYK values using a table or matrix. An output-side gamma correction unit 605 corrects signal values so that the signal values inputted into this output-side gamma correction unit 605 may be proportional to the reflection density values after duplicating and outputting. An encoded image synthesis unit 607 synthesizes the image data with the image data (of manuscript) corrected by the output-side gamma correction unit 605 and the encoded image data generated by encoding processing of the paper fingerprint information and document information that will be described later. In this occasion, the encoded image synthesis unit 607 selects a position that does not overlap the reading position of the paper fingerprint information and document information described above. That is, at the time of forming an image, the encoded image is formed at a position different from the reading position of the paper fingerprint information and document information. A halftone correction unit 606 performs halftone processing in conformity to the number of tones of the printer unit for outputting the image. This halftone correction unit 606, for example, binarizes the received image data of high number of tones or digitizes that data into 32 values.

Incidentally, each processing unit of the scanner image processing unit 312 and the printer image processing unit 315 can output the received data without performing the each processing thereon. Below, allowing the data to pass through a certain processing unit without performing the processing thereon is represented as "making data pass through".

<Encoding Processing of Paper Fingerprint Information and Document Information>

Figure 12:
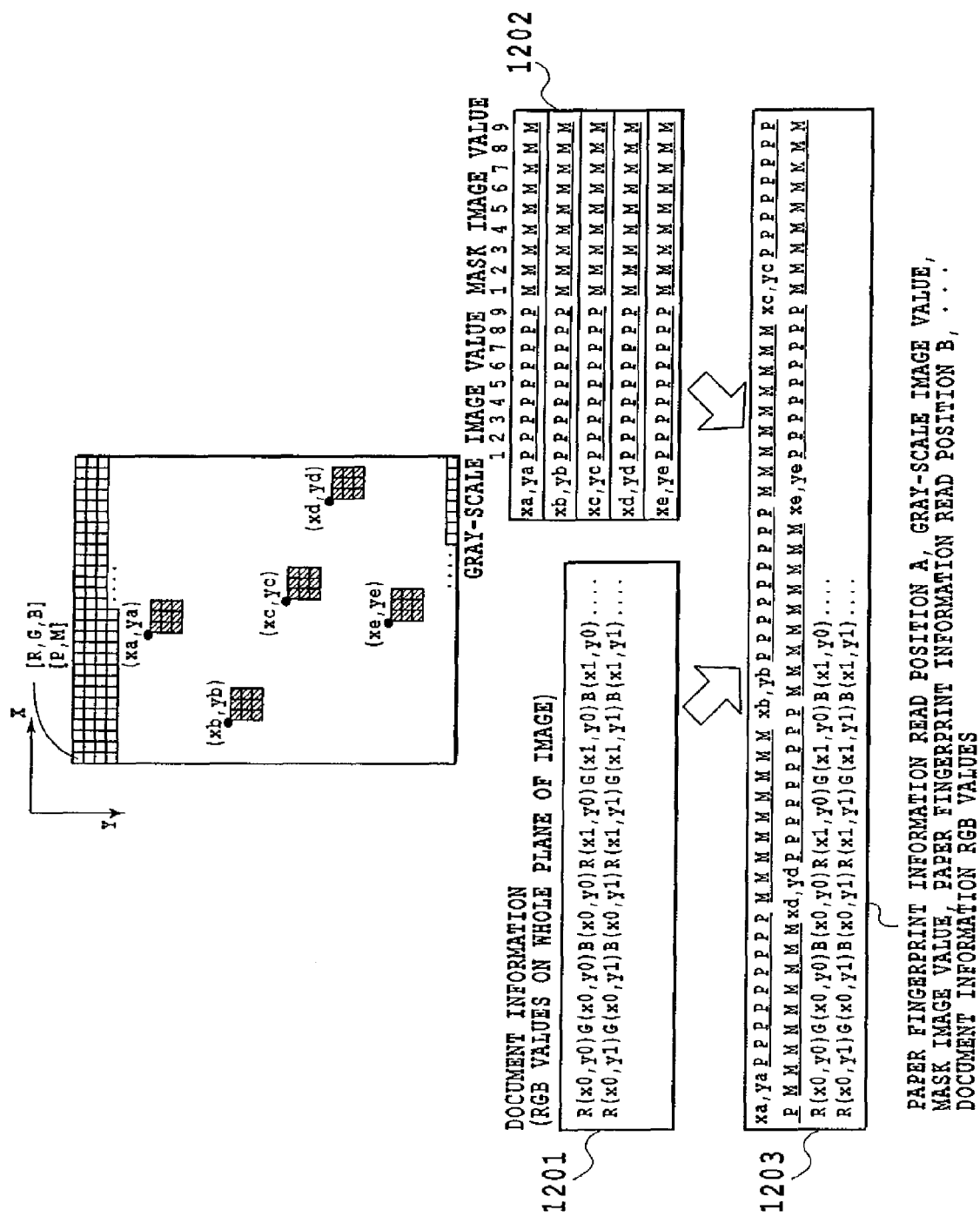
FIG. 12 is a diagram showing one example of encoded image data.

FIG. 11 is an example of the acquired document information. Correspondingly, FIG. 12 shows an example of the encoded image data and the paper fingerprint information (total five areas of 3×3 gray pixels) in the acquired document information. Encoded image data 1203 is generated with paper fingerprint information 1202 and document information 1201.

The CPU 301 can control in such a way that the paper fingerprint information and document information of a predetermined area sent from the paper fingerprint information acquisition unit 507 and the document information acquisition unit 509 to the RAM 302 are read and the encoding processing is performed thereon to generate the encoded image data (generation control of encoded image). In the encoding processing, a predetermined algorithm combines the paper fingerprint information and document information to generate the encoded image data as one item of data. Incidentally, in the encoded image data, either information for specifying a predetermined algorithm or a predetermined algorithm itself may be encoded together with the image data. Incidentally, in this specification, the encoded image is an image that is a two-dimensional code image or bar-code image or the like and that is generated by performing the encoding processing on the paper fingerprint information and document information.

Moreover, the CPU 301 can control in such a way that the generated encoded image data may be sent to the encoded image synthesis unit 607 in the printer image processing unit 315 using an unillustrated data bus (transmission control of encoded image).

Incidentally, executing a program stored in the ROM 303 performs the above-mentioned control (generation control and transmission control of encoded image).

<Separation Processing of Paper Fingerprint Information and Document Information>

The information extracted from the encoded image data by the decode unit 508 is sent to the RAM 302, and the CPU 301 separates the paper fingerprint information and document information using a predetermined algorithm. The separated paper fingerprint information and document information are sent again to the RAM 302.

<Paper Fingerprint Information Collation Processing>

The CPU 301 can control in such a way that the paper fingerprint information sent to the RAM 302 from the paper fingerprint information acquisition unit 507 may be read and the read paper fingerprint information may be collated with the registered paper fingerprint information. Incidentally, the registered paper fingerprint information means the paper fingerprint information included in the encoded image data.

Figure 9:
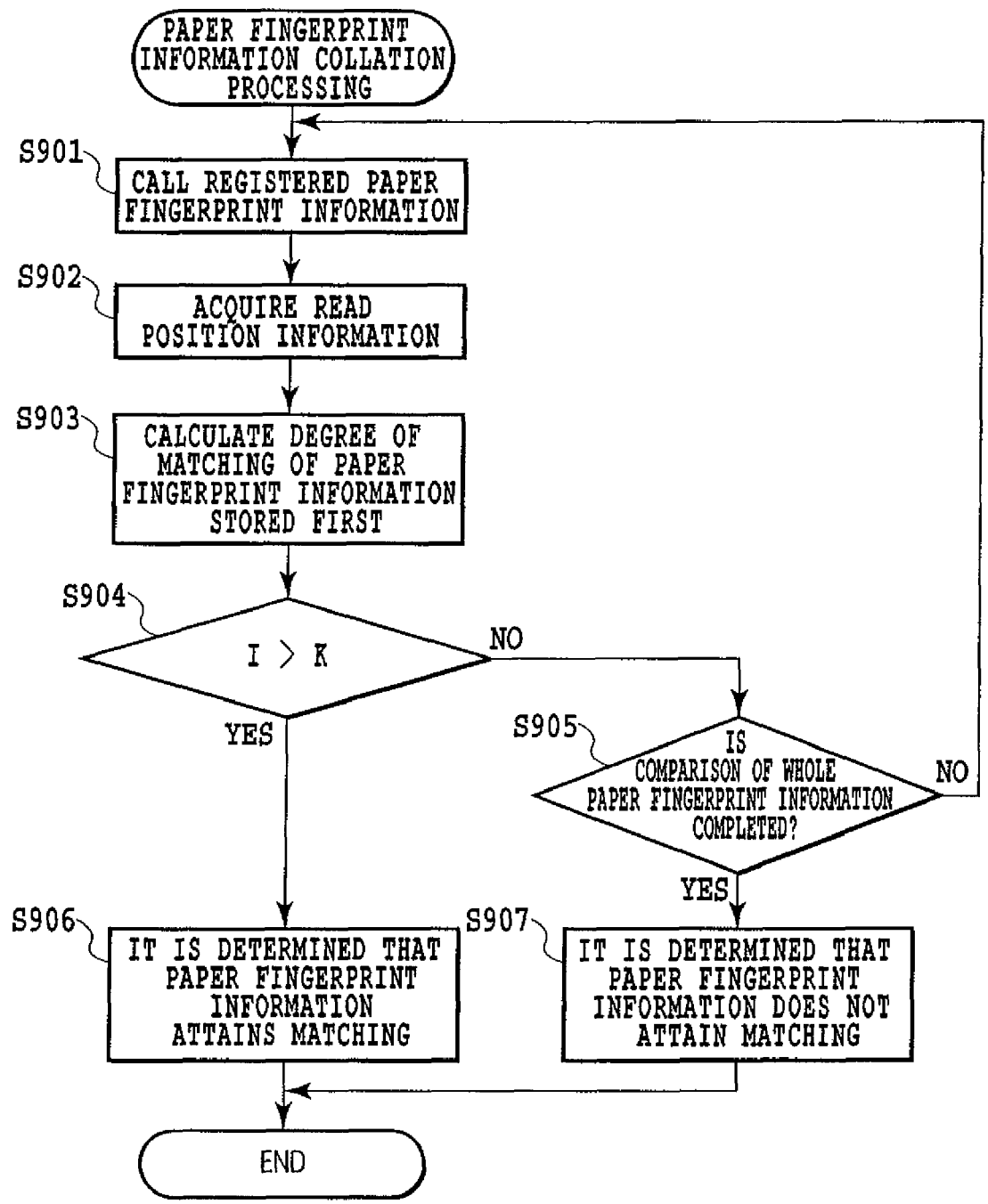
FIG. 9 is a flowchart of paper fingerprint information collation processing.

FIG. 9 is a flowchart showing a flow of this paper fingerprint information collation processing. The CPU 301 controls steps of this flowchart in an integrated manner.

In the flowchart of this FIG. 9, when the degree of matching (a degree of matching between the registered paper fingerprint information and the scanned paper fingerprint information) is found to be larger than a fixed threshold, the paper fingerprint of the scanned manuscript is determined to be a paper fingerprint of an original.

Moreover, when the degree of matching is found to be equal to or less than the fixed threshold, the paper fingerprint of the scanned manuscript is determined not to be the paper fingerprint of the original. In the case where a plurality of paper fingerprints are registered in the encoded image data, determination as to whether it is the original or counterfeit shall be referred to comparison of the next paper fingerprint information among a plurality of pieces of stored information.

In FIG. 9, corresponding correspondingly to the scanned paper document, paper fingerprint information that is registered (hereinafter referred to as registered paper fingerprint information) is taken out and temporarily stored in, for example, the RAM 302 or the HDD 304, and collation processing is performed. Here, it will be explained assuming that five paper fingerprint data as shown in FIG. 10 are acquired.

In Step S901 (Xa, Ya), the comparison of the paper fingerprint is started (calling the registered paper fingerprint information).

Here, the gray-scaled image data generated in Step S802 and the mask data are the paper fingerprint information of the whole manuscript that was scanned. The paper fingerprint information of the whole manuscript that was scanned is called scanned whole paper fingerprint information.

In Step S902, the scanned paper fingerprint information at (Xa, Ya) is acquired from an area corresponding to (matches) the acquisition position of the registered paper fingerprint information at (Xa, Ya) in the scanned whole paper fingerprint information.

In Step S903 (Xa, Ya), the degree of matching between the scanned paper fingerprint information at (Xa, Ya) and the registered paper fingerprint information at (Xa, Ya) is calculated. A method of calculating the degree of matching will be described later.

In Step S904, it is determined whether this degree of matching (I) is larger than a fixed threshold (K). If the degree of matching is larger than a fixed threshold (K), the flow proceeds to Step S906. Further, a fact that the paper fingerprint information attains matching in this Step S906 is stored in the RAM 302. On the other hand, if the degree of matching (I) is less than or equal to the fixed threshold (K), the flow proceeds to Step S905.

In Step S905, it is determined whether the comparison of all pieces of the paper fingerprint information is completed. If it is competed, the flow proceeds to Step S907. In this Step S907, a fact that the paper fingerprint information does not attain matching is stored in the RAM 302. On the other hand, if the comparison is not completed, it is so controlled that a position (Xb, Yb) of the paper fingerprint information stored in the next may be targeted. Then, the flow returns to the processing in Step S901.

<Method of Calculating Degree of Matching in Step S903>

The degree of matching between the scanned paper fingerprint information and the registered paper fingerprint information is calculated using the following formula.

$$E = \frac{\sum_{x,y} \alpha_1(x, y)\alpha_2(x, y)\{f_1(x, y) - f_2(x, y)\}^2}{\sum_{x,y} \alpha_1(x, y)\alpha_2(x, y)} \quad \text{[Formula 1]}$$

In the above-mentioned formula 1, $\alpha_1$ is the mask data in the registered paper fingerprint information. $f_1$ is gray-scale image data in the registered paper fingerprint information. $\alpha_2$ is the mask data in the scanned paper fingerprint information. $f_2$ is gray-scale image data in the scanned paper fingerprint information.

Here, when $\alpha_1(x, y)=1$, it shows that a pixel at a pixel position (x, y) is bright. That is, it shows that, when the manuscript is scanned in order to acquire the registered paper fingerprint information, a color material (a toner or ink) or dust dose not lie on the pixel existing at the pixel position (x, y) in the manuscript.

Here, when $\alpha_2(x, y)=1$, it shows that the pixel at the pixel position (x, y) is bright. That is, it shows that, when the manuscript is scanned in order to acquire the scanned paper fingerprint information, a color material (a toner or ink) or dust dose not lie on the pixel existing at the pixel position (x, y) in the manuscript.

Incidentally, when $\alpha_1(x, y)=1$ and $\alpha_2(x, y)=1$ hold for all the pixels, namely, when in acquiring both of the paper fingerprint information, neither color material nor dust lies on the manuscript, the formula 1 becomes the same as the following formula 2.

$$E = \sum_{x=0, y=0}^{n,m} \{f_1(x, y) - f_2(x, y)\}^2 \quad \text{[Formula 2]}$$

This $\{f_1(x, y) - f_2(x, y)\}$ represents a square value of a difference between the gray-scale image data in the registered paper fingerprint information and the gray-scale image data in the scanned paper fingerprint information. Therefore, the above-mentioned formula 1 attached with $\Sigma$ is a sum of squared differences between respective two pixels of the two pieces of the paper fingerprint information. That is, the more the number of pixels in each of which $f_1(x, y)$ is alike $f_2(x, y)$, the smaller value this value E takes.

Then, the degree of matching (I) is defined by 1/E.

Incidentally, in this embodiment, the use of symbols $\alpha_1(x, y)$ and $\alpha_2(x, y)$ has made it possible to calculate the degree of matching without using the gray-scale data of a dark pixel.

Here, a reason of not using the gray-scale data in a dark pixel will be explained. A dark pixel carries a color material or dust on it, and the color material and dust make information of tangling fiber disappear. Therefore, if the gray-scale data of a dark pixel is used to determine the degree of matching of the paper fingerprint information, the degree of matching will become a value showing whether the pixel position of the pixel on which the color material or ink lies at the time of scanning matches that at the time of registration. However, what is intended to be obtained is the degree of matching between two pieces of the paper fingerprint information, being neither the degree of matching of the dust position nor the degree of matching between two pixel positions on which the color material lies.

Therefore, in this embodiment, the degree of matching is calculated using the symbols of $\alpha_1(x, y)$ and $\alpha_2(x, y)$, without using the gray-scale data of the dark pixel (pixel that is likely to carry the color material or dust on it).

<Document Information Collation Processing>

The CPU 301 can control so that the document information sent from the document information acquisition unit 509 to the RAM 302 may be read and the read document information and the registered document information may be collated with each other. Incidentally, the registered document information refers to the document information included in the encoded image data.

Figure 13:
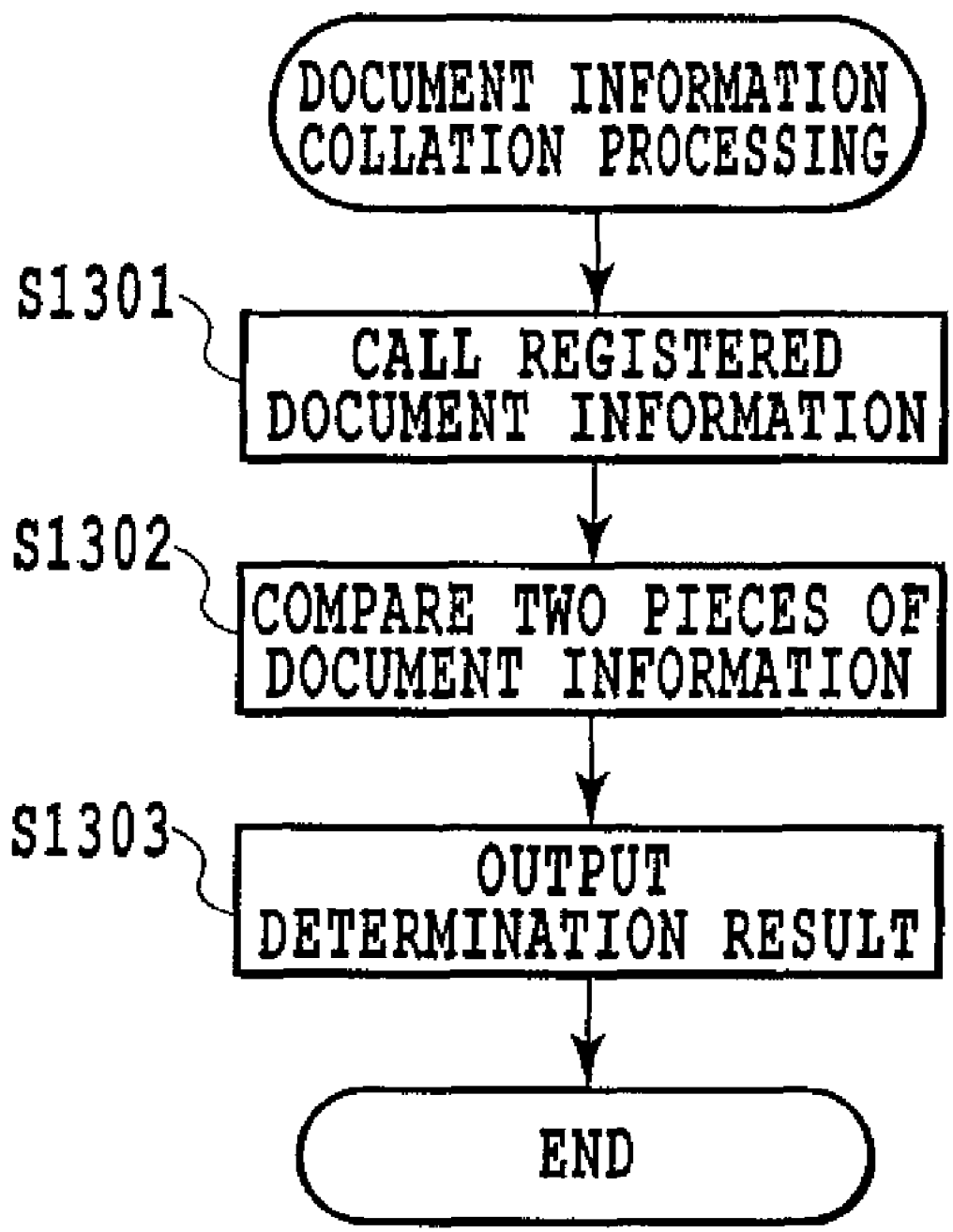
FIG. 13 is a flowchart of document information collation processing.

FIG. 13 is a flowchart showing a flow of this document information collation processing. The CPU 301 controls steps of this flowchart in an integrated manner.

In Step S1301, the CPU 301 takes out the document information included in the decoded image data that was separated from the paper fingerprint information.

In Step S1302, the CPU 301 collates the document information sent from the document information acquisition unit 509 with the document information taken out in Step S1301. The CPU 301 compares the RGB values of the pixels and collates whether the pixel values of the areas attain matching.

In Step S1303, the CPU 301 determines whether areas of a predetermined threshold or more matches each other based on the collation results of pixel values of the areas that were obtained in Step S1302, and makes a decision "existence of tampering" or "absence of tampering" in the document.

<Explanation of Operation Screen>

Figure 7:
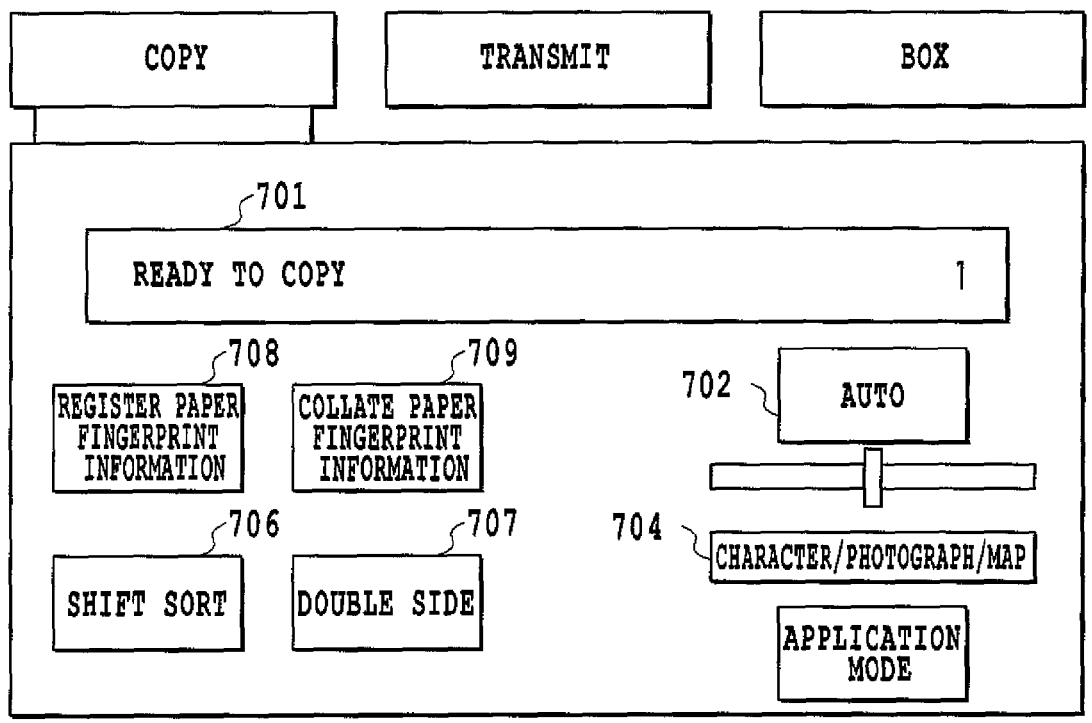
FIG. 7 is a diagram of an operation screen of the image formation apparatus according to the one embodiment of the present invention.

FIG. 7 is an operation screen diagram in the image formation apparatus 10. An area 701 shows whether the image formation apparatus 10 is ready to copy and the number of copies being set. The manuscript selection tab 704 is a tab for selecting the type of manuscript. Upon depression of this tab, a selection menu of three types of character, photograph, and character/photograph modes is displayed in a pop-up. A finishing tab 706 is a tab for performing setting related to various finishing. A double-sided setting tab 707 is a tab for performing setting related to double-sided reading and double-sided printing. A reading mode tab 702 is a tab for selecting a reading mode of the manuscript. Upon depression of this tab, a selection menu of three types of color, black, and automatic (ACS) modes is displayed in the pop-up. Incidentally, when color is selected, color copy is performed; when black is selected, monochrome copy is performed. When ACS is selected, a copy mode is determined according to the color/monochrome determination signal described above.

An area 708 is a tab for selecting the paper fingerprint information registration processing. The paper fingerprint information registration processing will be described later. An area 709 is a tab for selecting the paper fingerprint information collation processing. This paper fingerprint information collation processing will be described later.

<Operation at the Time of Tab of Paper Fingerprint Information Registration Processing being Pressed>

Next, the paper fingerprint information registration processing that is performed when the start key is pressed after the user pressed the paper fingerprint information registration tab 709 shown in FIG. 7 will be explained.

Figure 14:
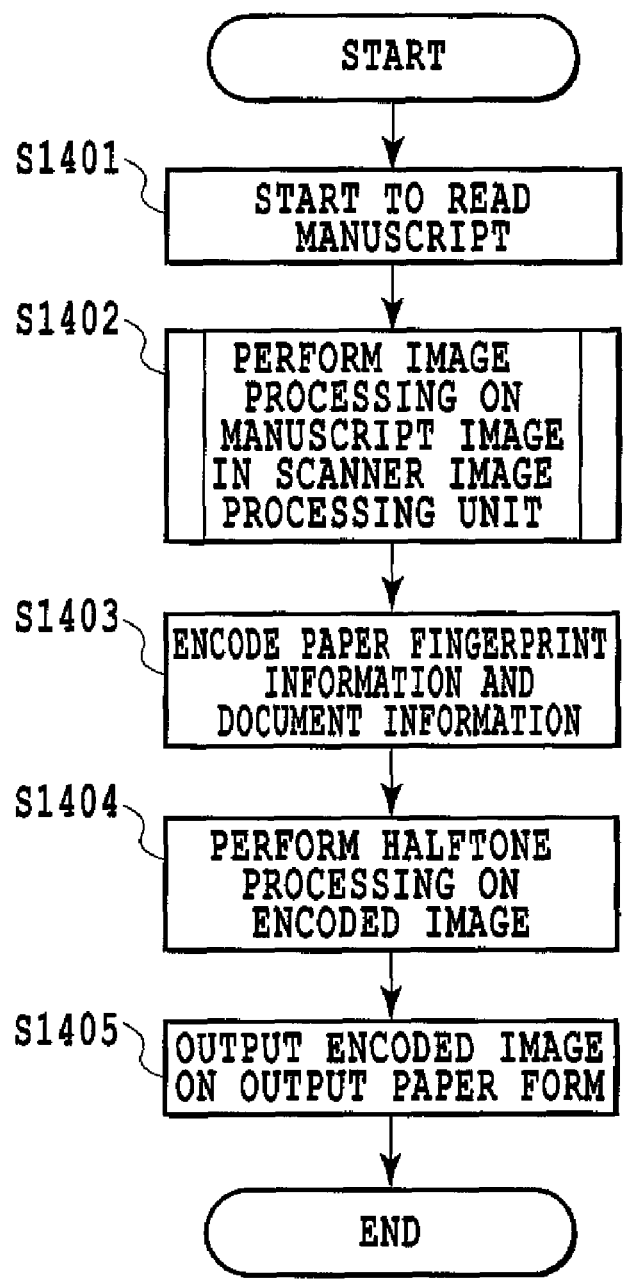
FIG. 14 is a flowchart of paper fingerprint information registration processing.

FIG. 14 is a flowchart showing a flow of this paper fingerprint information registration processing. The CPU 301 controls steps of this flowchart in an integrated manner.

In Step S1401, the scanner 13 is controlled by the CPU 301 so as to send a manuscript to the scanner image processing unit 312 through the scanner I/F 311 as image data.

Figure 16:
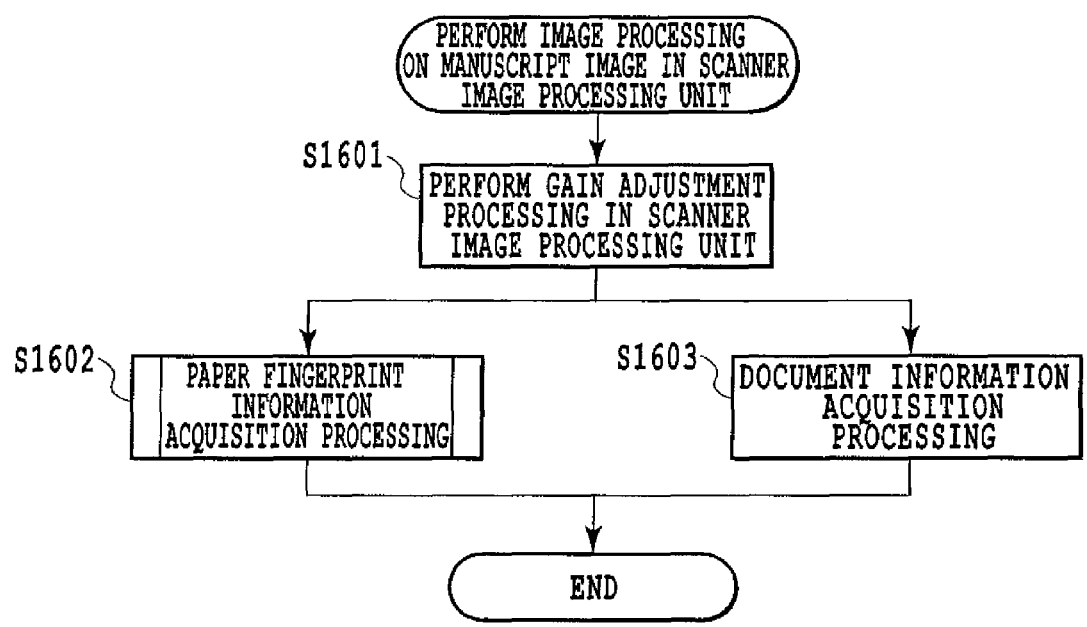
FIG. 16 is a flowchart of image processing performed in the scanner image processing unit at the time of registering an original.

In Step S1402, two processing steps, i.e., paper fingerprint information acquisition and document information acquisition are performed. FIG. 16 shows a detailed flowchart of the processing performed in Step S1402.

In Step S1601, the scanner image processing unit 312 sets a general gain adjustment value in the shading correction unit 500, and performs processing shown in FIG. 5 to generate the attribute data together with new image data. Moreover, the scanner image processing unit 312 makes this attribute data accompany the image data. Furthermore, the scanner image processing unit 312 sets a gain adjustment value smaller than the above-mentioned general gain adjustment value in the shading correction unit 500. Subsequently, the scanner image processing unit 312 outputs to both the paper fingerprint information acquisition unit 507 and the document information acquisition unit 509 the luminance signal values that were obtained by applying the smaller gain adjustment value to the image data. Then, based on the output data, the paper fingerprint information acquisition unit 507 acquires the paper fingerprint information in Step S1602. Subsequently, the paper fingerprint information acquisition unit 507 sends the acquired paper fingerprint information to the RAM 302 using an unillustrated data bus.

In Step S1603, the document information acquisition unit 509 acquires the document information, and sends the acquired document information to the RAM 302 using an unillustrated data bus. Incidentally, the paper fingerprint information acquisition processing and the document information acquisition processing may be processed in parallel, or may be processed sequentially. Moreover, the image sent to the document information acquisition unit 509 may be an image that was not subjected to the gain adjustment described above and is sent directly from the masking processing unit.

When the processing in Step S1402 of FIG. 14 is completed, processing in Step S1403 is started. In Step S1403, the CPU 301 controls in such a way that the paper fingerprint information and document information may be encoded to generate an encoded image, and the generated encoded image data may be transmitted to the encoded image synthesis unit 607 in the printer image processing unit 315.

In Step S1404, the printer image processing unit 315 transmits the encoded image data generated in Step S1403 from the encoded image synthesis unit 607 to the halftone correction unit 606. Subsequently, the halftone correction unit 606 performs the halftone processing on the encoded image data (however, since the encoded image data is generated as binary at the time of Step S1403, the encoded image data does not change through this halftone processing). The encoded image data after the halftone processing is sent to the printer 14 through the printer I/F 314. In Step S1405, the printer 14 forms an image of the encoded image data on an output paper form.

That is, the manuscript scanned in Step S1401 has again been set to the tray 202 by the user after the scanning, and thereby, an image of the encoded image data is formed on the manuscript being set to the tray 202 in Step S1405.

Although in this embodiment, paper fingerprint information registration processing is started by the user pressing the paper fingerprint information registration tab 708 of the operation panel 12, the start is not limited to this and may be done according to a start instruction of the paper fingerprint information registration processing transmitted from the PC 40.

<Operation at the Time of Tab of Paper Fingerprint Information Collation Processing being Pressed>

Next, the paper fingerprint information collation processing that is executed when the start key is pressed after the user pressed the paper fingerprint information collation tab 709 shown in FIG. 7 will be explained.

Figure 15:
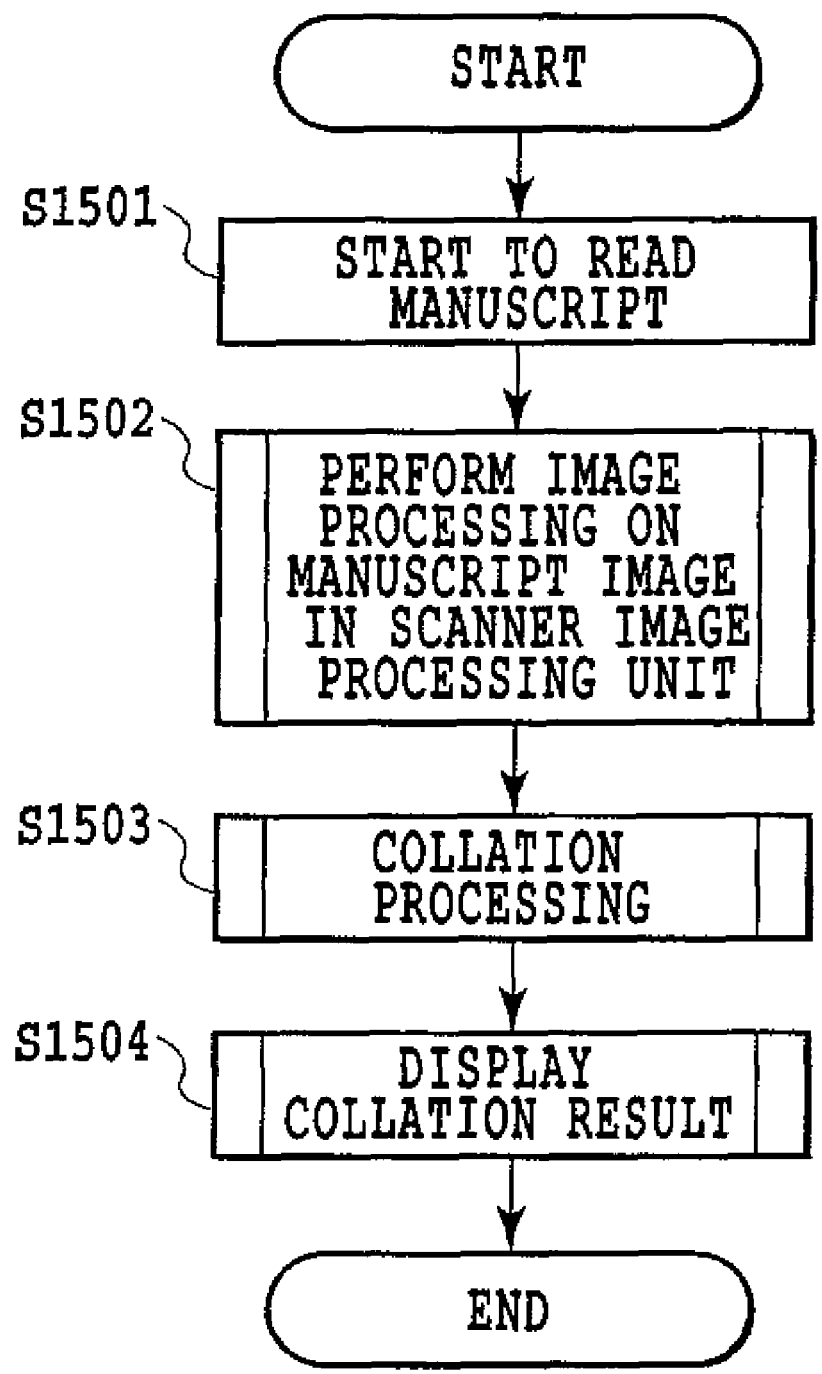
FIG. 15 is a flowchart of the paper fingerprint information collation processing.

FIG. 15 is a flowchart showing this paper fingerprint information collation processing. The CPU 301 controls steps of this flowchart in an integrated manner.

In Step S1501, the scanner 13 is controlled by the CPU 301 so as to send a manuscript read by the scanner 13 to the scanner image processing unit 312 through the scanner I/F 311 as image data.

Figure 17:
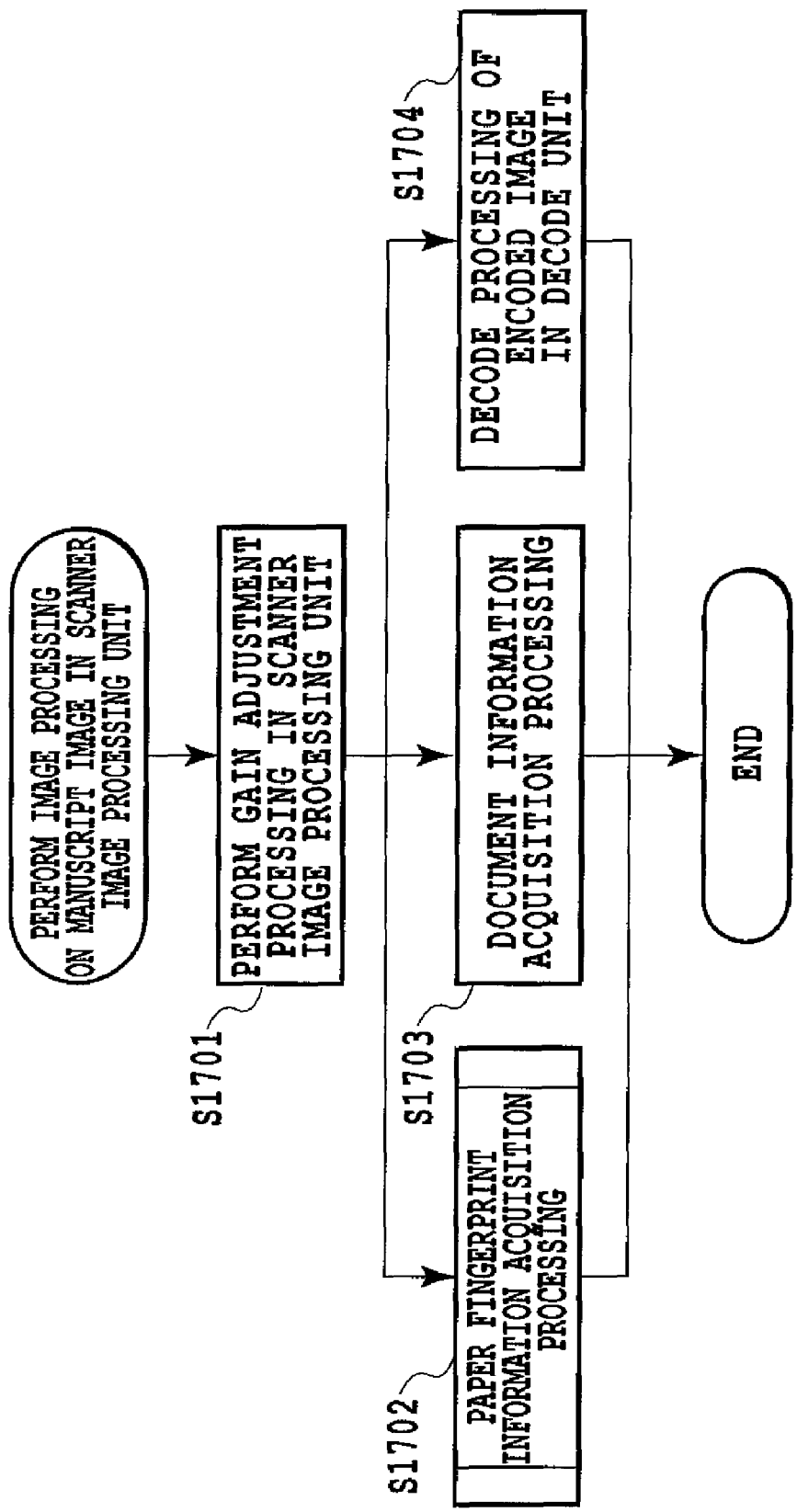
FIG. 17 is a flowchart of image processing performed in the scanner image processing unit at the time of collating the original.

In Step S1502, three processing steps, i.e., the paper fingerprint information acquisition processing, the document information acquisition processing, and decoding processing of encoded image, are performed. FIG. 17 shows a detailed flowchart of the processing performed in Step S1502. The scanner image processing unit 312 performs processing shown in FIG. 5 on this image data to generate the attribute data together with the new image data. Moreover, the scanner image processing unit 312 makes this attribute data accompany the image data.

In Step S1701, in order to acquire the paper fingerprint information, the gain adjustment of the shading correction unit 500 described above etc. is processed. In Step S1702, the paper fingerprint information acquisition unit 507 in the scanner image processing unit 312 acquires the paper fingerprint information. Subsequently, the paper fingerprint information acquisition unit 507 sends the acquired paper fingerprint information to the RAM 302 using an unillustrated data bus.

In Step S1703, after acquiring the document information and performing predetermined processing thereon, the document information acquisition unit 509 in the scanner image processing unit 312 sends the acquired document information to the RAM 302 using an unillustrated data bus.

Moreover, in Step S1704, when an encoded image exists, the decode unit 508 in the scanner image processing unit 312 decodes the encoded image, and acquires the paper fingerprint information and document information that are included in the encoded image. Subsequently, the decode unit 508 sends the acquired information to the RAM 302 using an unillustrated data bus.

The paper fingerprint information acquisition processing, the document information acquisition processing, and the decoding processing of encoded image may be processed in parallel, or may be processed sequentially. Moreover, the image sent to the document information acquisition unit 509 and the decode unit 508 may be an image that was not subjected to the gain adjustment described above and is sent directly from the masking processing unit.

Figure 18:
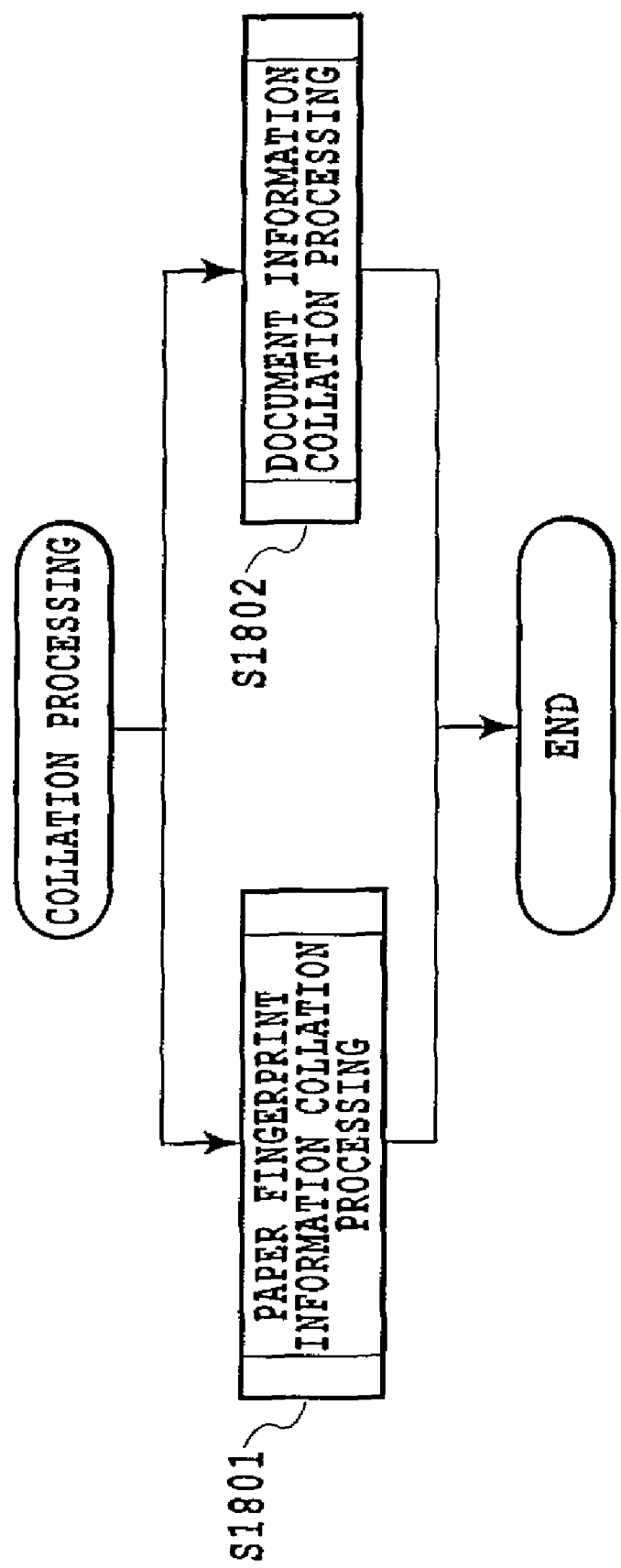
FIG. 18 is a flowchart of original collation processing.

In Step S1503 of FIG. 15, two processing steps, i.e., the paper fingerprint information collation processing and the document information collation processing are performed. FIG. 18 shows a detailed flowchart of the processing performed in Step S1503. The paper fingerprint information collation processing (Step S1801) is just as <Paper fingerprint information collation processing> explained using FIG. 9. The document information collation processing (Step S1802) is just as <Document information collation processing> explained using FIG. 13.

Figure 19:
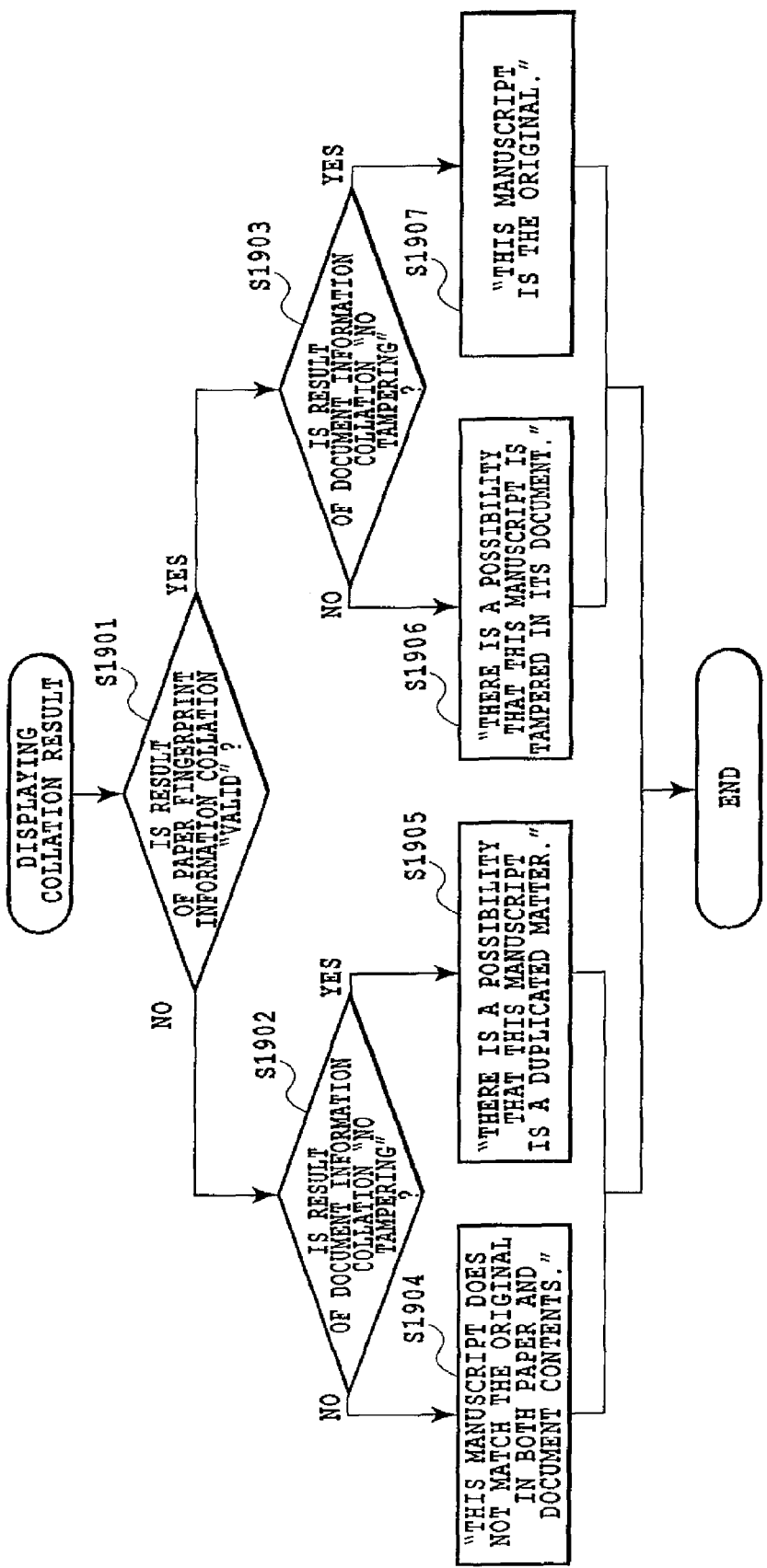
FIG. 19 is a flowchart of display processing of a collation result.

In Step S1504, the CPU 301 controls so that results obtained by <Paper fingerprint information collation processing> and <Document information collation processing> may be displayed on a display screen of the operation panel 12. FIG. 19 shows a detailed flowchart of the processing performed in Step S1504.

In Step S1901, the CPU 301 determines whether the paper fingerprint information is valid (whether the paper fingerprint information attains matching). Subsequently, in Steps S1902 and S1903, the CPU 301 determines whether there is tampering in the document information (whether the document information attains matching) for either of determination results in Step S1901. From the above determination results, the CPU 301 makes the operation panel 12 display as below.

If both the paper fingerprint information and document information attain matching (S1907) .... Display that the manuscript is guaranteed to be the original.

If only the document information attains matching (Step S1906) .... Display that the document is tampered.

If only the document information attains matching (Step S1905) .... Display that there is a possibility the manuscript is a duplicated matter.

If neither the paper fingerprint information nor the document information attains matching (Step S1904) .... Display that there is a possibility the manuscript is a duplicated matter and that the document is tampered.

Although in this embodiment, the paper fingerprint information collation processing is started by the user pressing the paper fingerprint information collation tab 709 of the operation panel 12, the start is not limited to this and may be done according to a start instruction of the paper fingerprint information collation processing transmitted from the PC 40.

Thus, in the present invention, an encoded image obtained by encoding not only paper fingerprint information but also document information is formed on the original. Moreover, when collating the manuscript, its identity is determined with the paper fingerprint information and document information. Doing so makes the present invention able to prevent incorrect recognition of authenticity guarantee that may be caused by the paper fingerprint acquisition area and the encoded image being cut off, and makes it possible to realize higher-reliability authenticity guarantee.

Incidentally, in this embodiment, the result obtained by the collation processing is displayed on the operation panel 12 according to the obtained result. A purpose of this display is to inform the user of the result of collation. Therefore, in the present invention, the apparatus may be configured to print-output sounds patterned according to the result of collation and the result of the above-mentioned collation, regardless of display on the operation panel 12. That is, as long as the user can recognize the result of collation, any method may be used to inform the user of it.

Second Embodiment

In the first embodiment, the embodiment where the image formation apparatus 10 displays the collation processing and the result of collation. However, the above-mentioned collation processing and the results of collation may be displayed on the PC 40.

Third Embodiment

The document that serves as the original (The document that is to be the original) may occasionally suffer additional writing because of human carelessness. In such a case, the authenticity guarantee by the method described in the first embodiment determines that the document is tampered because of inconsistency in the document information. This leads to a situation where there is not an original at all in the world.

In view of this, in this embodiment, only if it is determined that there is a possibility of the document being tampered, reissue of the original becomes possible upon user's request of reissue of the original (namely, the original is newly reissued). By the reissue, the following two data are synthesized: encoded image data whose document information is the same as the original, but only whose paper fingerprint information is updated; and image data of the former original that was regenerated from the decoded data. Then, a printed matter on which the authenticity guarantee is possible is generated again.

That is, in this embodiment, the original before being added with postscript or being smeared can be reproduced on a new paper form using the encoded image data that is regenerated.

Figure 20:
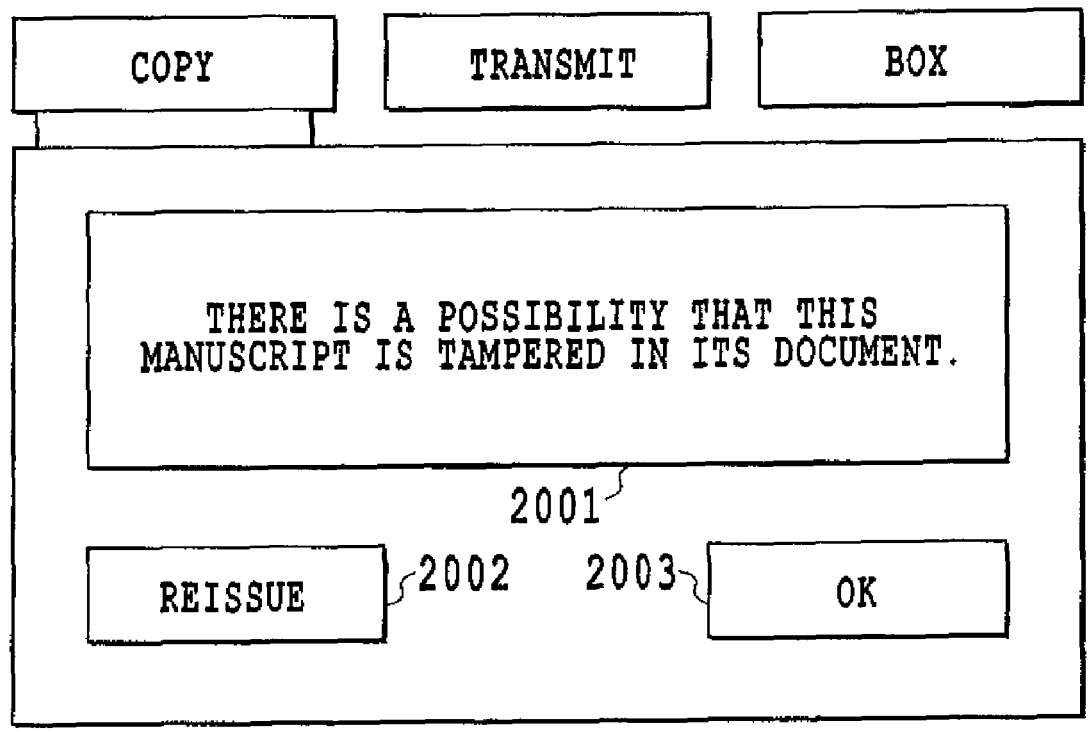
FIG. 20 is a diagram showing an example of a display of the collation result.

FIG. 20 shows an example of a screen display of a collation result of the manuscript according to this embodiment. When it is determined that "In this manuscript, there is a possibility of the document being tampered."(2001), pressing "OK" ends the processing if the user wishes to know only a collation result (2003). When the user wishes to reissue the original, a new original without smudges and additional writing can be issued by pressing "Reissue" (2002).

<Processing when Reissue Button is Pressed>

Figure 21:
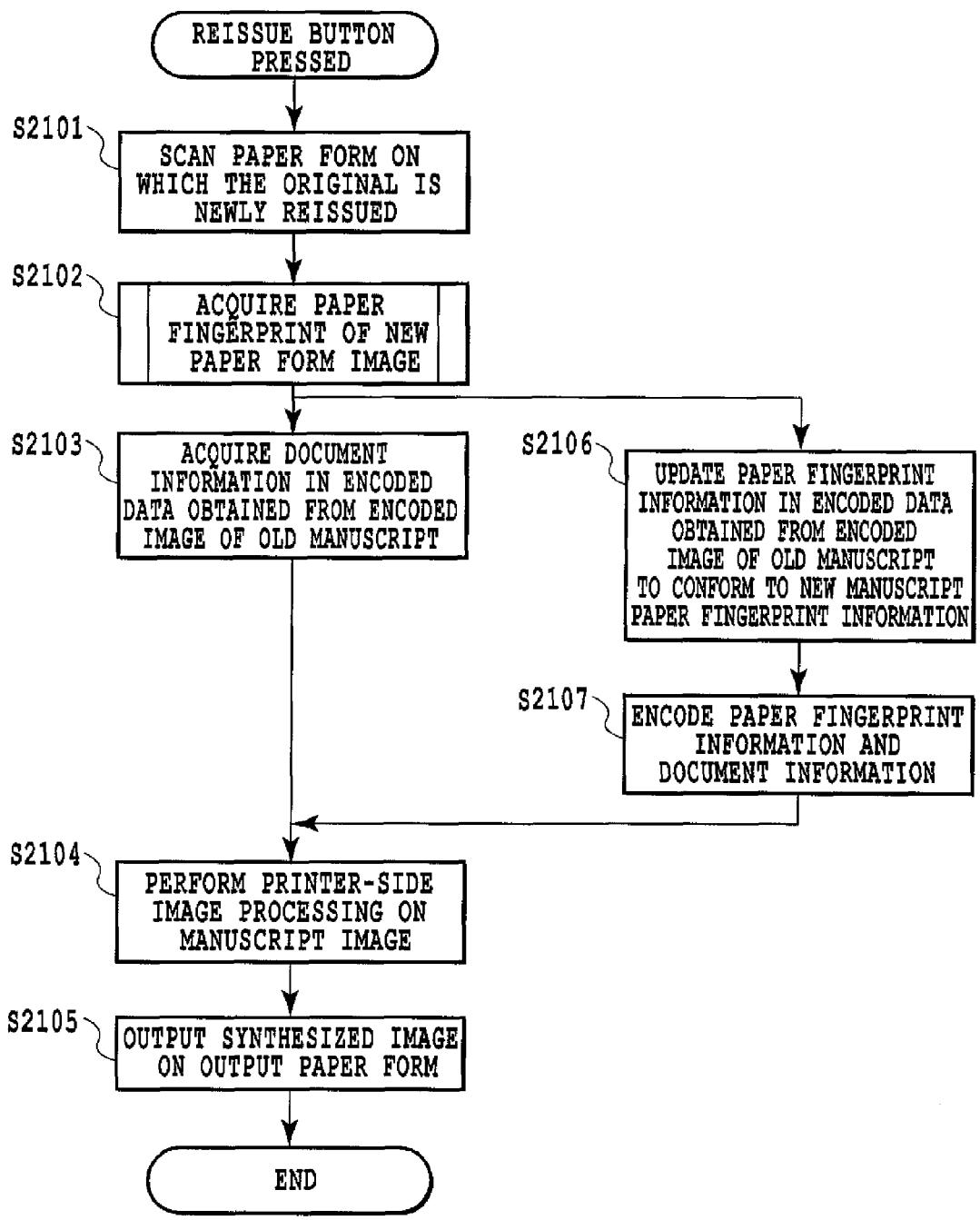
FIG. 21 is a flowchart of original reissue processing.

FIG. 21 is a flowchart showing a flow of the processing when a reissue button is pressed. The CPU 301 controls steps of this flowchart in an integrated manner.

In Step S2101, the scanner 13 is controlled by the CPU 301 so as to send the original read by the scanner 13 to the scanner image processing unit 312 through the scanner I/F 311 as image data.

In Step S2102, paper fingerprint information acquisition processing is performed for a new paper form. Details of the processing performed here are the same as those of the processing explained using FIG. 8.

That is, after setting a general gain adjustment value in the shading correction unit 500, the scanner image processing unit 312 performs processing shown in FIG. 5 on this image data to generate new image data. Moreover, the scanner image processing unit 312 sets a gain adjustment value smaller than the above-mentioned general gain adjustment value in the shading correction unit 500. Subsequently, the scanner image processing unit 312 outputs to the paper fingerprint information acquisition unit 507 the luminance signal values obtained by applying the smaller gain adjustment value to the image data. Then, based on the output data, the paper fingerprint information acquisition unit 507 acquires the paper fingerprint information. Subsequently, the paper fingerprint information acquisition unit 507 sends the acquired paper fingerprint information to the RAM 302 using an unillustrated data bus.

When the processing in Step S2102 is completed, processing in Step S2103 and that in Step S2106 will be started simultaneously.

In Step S2106, the CPU 301 reads decoded data of the encoded image obtained when the old manuscript was scanned from the RAM 302. Then, the CPU 301 updates paper fingerprint information among the encoded data to the taken-out paper fingerprint information of the new paper form in Step S2102.

In Step S2107, the paper fingerprint information updated as described above and the document information of the decoded data stored in the RAM 302 are encoded again. These encoded data are encoded as shown in FIG. 12, two pieces of information being combined into one data.

In Step S2103, the document information (image data) of the decoded data stored in the RAM 302 is transmitted to the printer image processing unit 315. The printer image processing unit 315 performs image data editing according to the attribute data accompanying the image data. This processing is processing shown in FIG. 6.

In Step S2104, the encoded image data generated in Step S2107 and the image data (of the manuscript) obtained in Step S2103 are synthesized. More specifically, the encoded image synthesis unit 607 synthesizes the image data (of the manuscript) outputted from the output-side gamma correction unit 605 in Step S2103 and the encoded image data generated in Step S2107. Subsequently, the halftone correction unit 606 performs the halftone processing on the synthetic image data obtained by the synthesis in conformity to the number of tones of the printer unit for outputting the image. The synthetic image data after the halftone processing is sent to the printer 14 through the printer I/F 314.

In Step S2105, the printer 14 forms an image of the synthetic image data on the output paper form.

Thus, when the reissue button was pressed, the user has set a paper form (a new paper form) for newly reissuing the original that was scanned in Step S2101 in the tray 202 after the scanning. Subsequently, an image of the synthetic image data including the document information of the decoded data of the old manuscript obtained in Step S2103 and the encoded image data generated in Step S2107 is formed on the paper form already being set.

Although in this embodiment, original reissue processing is started by the user pressing the reissue button, the start is not limited to this and may be done according to a start instruction of the original reissue processing transmitted from the PC 40.

Fourth Embodiment

In the above-mentioned embodiments, the paper fingerprint information and document information are embedded in a paper form that serves for the original (a paper form that is to be the original). That is, the paper fingerprint information is embedded in a paper fingerprint acquisition area of the paper form, while the document information is embedded in a document information acquisition area of the paper form. On the other hand, in this embodiment, the server for saving the paper fingerprint information and document information of the original is prepared, and reference information to the server is embedded in the original. At the time of collating the original, authenticity can be determined by accessing to the server designated by the reference information. The reference information will be explained in detail below.

Figure 22:
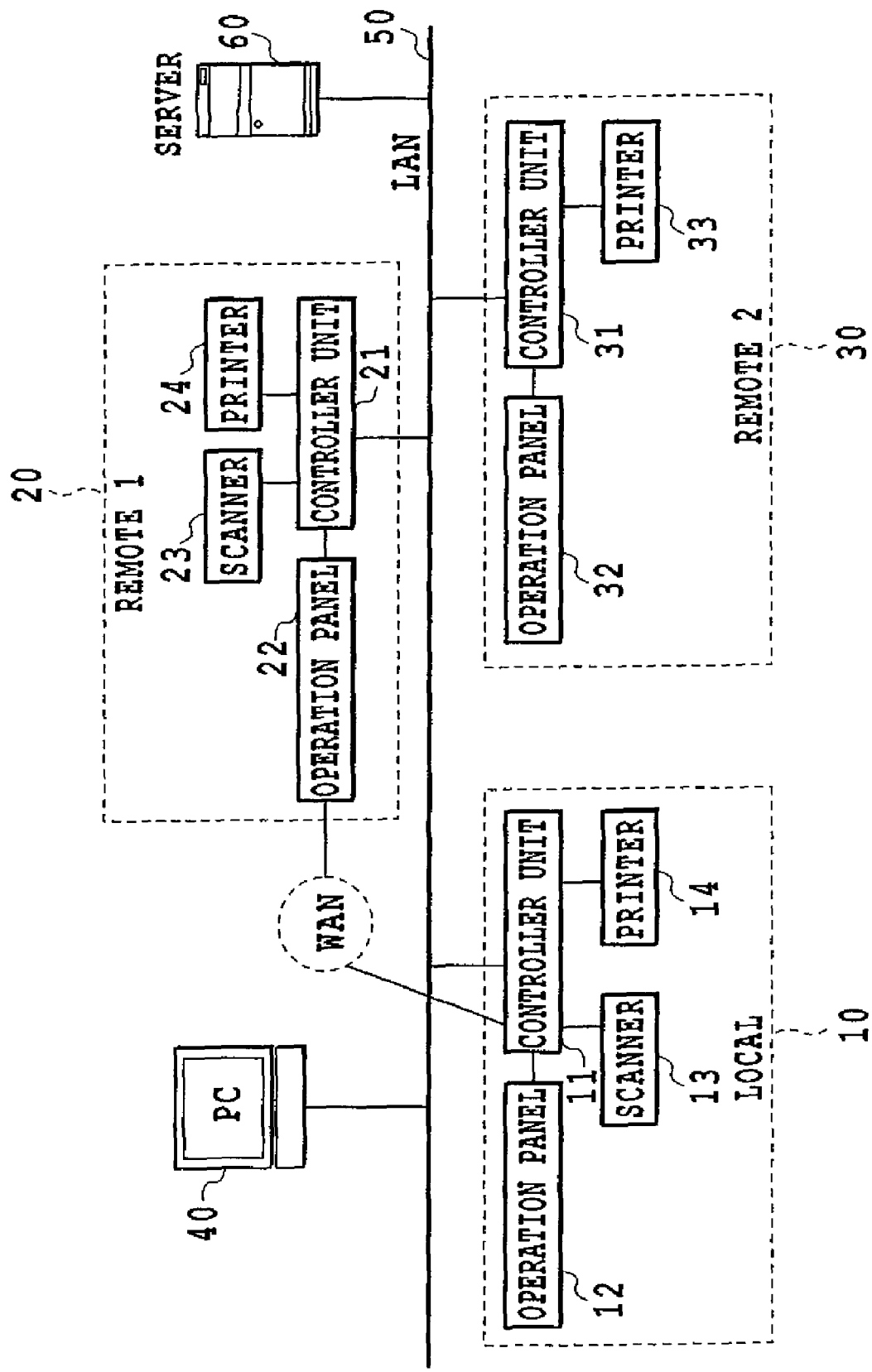
FIG. 22 is a block diagram showing the image processing system according to the one embodiment of the present invention.

FIG. 22 is a block diagram showing an image processing system according to this embodiment. As compared with the block diagram of the image processing system shown in FIG. 1, the image processing system according to this embodiment is added with a server 60. The server 60 is connected with the host computer 40 and the image formation apparatuses 10, 20, and 30 so as to be communicable with these elements through the LAN 50. Incidentally, the image processing system according to this embodiment allows a plurality of servers to be connected therewith. Moreover, the server can perform <Paper fingerprint information collation processing> and <Document information collation processing> like the image formation apparatus described above.

<Registration of Server>

First, an administrator of the image processing system according to the present invention sets a server that is used to guarantee the authenticity in the image formation apparatus. This setup is conducted for each image formation apparatus. In addition, the administrator can also alter the setup at timing that accords to necessity.

Figure 23:
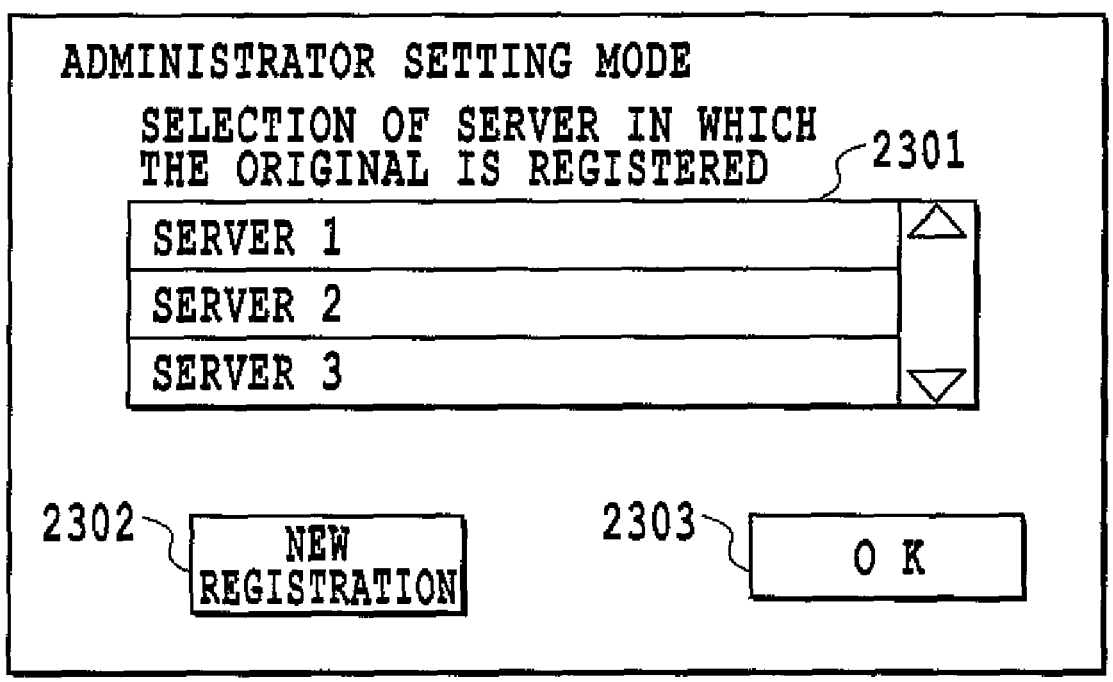
FIG. 23 is a view of the operation screen of the image formation apparatus according to the one embodiment of the present invention.

FIG. 23 illustrates a screen of administrator setting items that is displayed in the operation panel 12 of the image formation apparatus. In order to register the server in the image formation apparatus, the administrator can select such a server registration screen. Pressing the new registration button 2302 enables the administrator to register the server in the image formation apparatus. In addition, the manager can also determine the server and register it by selecting a desired server from among a list 2301 of a plurality of already registered candidate servers and pressing an OK button 2303. Information of the registered servers is stored in the RAM 302 or the HDD 304.

Figure 24:
FIG. 24 is a diagram showing an example of a table retained in a server for original collation.

FIG. 24 shows a table 2401 that has an area for storing the paper fingerprint information and document information and an index value corresponding to it. This index value differs for a printed matter to a printed matter, designating a printed matter uniquely. The server retains the table 2401 as shown in FIG. 24, and is controlled to, when receiving the paper fingerprint information and document information from the image processing apparatus, store them in a predetermined area of the table.

<Acquisition Processing of Paper Fingerprint Information and Document Information>

First, a manuscript is scanned like the first embodiment. The CPU 301 reads the paper fingerprint information and document information of a predetermined area that were sent from the paper fingerprint information acquisition unit 507 and the document information acquisition unit 509 to the RAM 302, and stores them in the HDD 304. Unlike other embodiments, the document information refers to the whole image data obtained by scanning in this embodiment.

<Encoding Processing of Reference Information>

Each time the original is generated, the CPU 301 inquires the registered server of the index value of an area in which the paper fingerprint information and document information should be stored. When receiving the inquiry from the CPU 301, the server checks the tail end of the table and sends the index value designating the tail end back to the image processing apparatus. The sent-back index value is stored in the RAM 302 or the HDD 304 as the reference information together with the registered server information. Each time the original is generated, the reference information in the RAM 302 or the HDD 304 is updated.

Subsequently, the CPU 301 can be controlled so as to read the reference information from the RAM 302 or the HDD 304 and generate encoded image data by performing the encoding processing (generation control of the encoded image). Incidentally, as described above, the encoded image is an image that is a two-dimensional code image, a bar-code image, or the like, and that is generated by performing the encoding processing on the reference information.

Furthermore, the CPU 301 can be controlled so as to send the generated encoded image data to the encoded image synthesis unit 607 in the printer image processing unit 315 using an unillustrated data bus (transmission control of encoded image).

Incidentally, executing a program stored in the ROM 303 performs the above-mentioned control (generation control and transmission control of encoded image).

<Storing Processing of Paper Fingerprint Information and Document Information in Server>

The CPU 301 transmits to the server the paper fingerprint information and document information of the original that is stored in either the RAM 302 or the HDD 304 through the LAN 50 based on the reference information stored in the HDD 304. The transmitted paper fingerprint information and document information are stored in an area designated by the index value of the table 2401 that the server retains.

<Collation Processing of Paper Fingerprint Information and Document Information in Server>

When encoded image data exists in the image data outputted from the masking processing unit 501, the decode unit 508 detects its existence, decodes the encoded image data, and takes out information. That is, the reference information is extracted from the encoded image data. Subsequently, the CPU 301 specifies the server based on the extracted reference information, and accesses to the specified server through the LAN 50. At the same time of this occasion, the CPU 301 reads the paper fingerprint information and document information of a predetermined area of a scanned paper form that was sent from the paper fingerprint information acquisition unit 507 and the document information acquisition unit 509 to the RAM 302, and transmits them together with the index value included in the reference information to the specified server.

Subsequently, the server collates the paper fingerprint information and document information that were received with the paper fingerprint information and document information in an area of a table designated by the received index value, respectively. In each information, the collation is performed by the same algorithm as that of <Paper fingerprint information collation processing> and <Document information collation processing>.

<Explanation of Operation Screen>

An operation screen according to this embodiment is the same as FIG. 7 described above. However, details of processing when each tab is pressed are different, and so the details of the processing will be explained below.

<Operation at the Time of Tab of Paper Fingerprint Information Registration Processing being Pressed>

The paper fingerprint information registration processing that will be executed when the start key is pressed after the user pressed the paper fingerprint information registration tab 708 shown in FIG. 7 will be explained.

Figure 25:
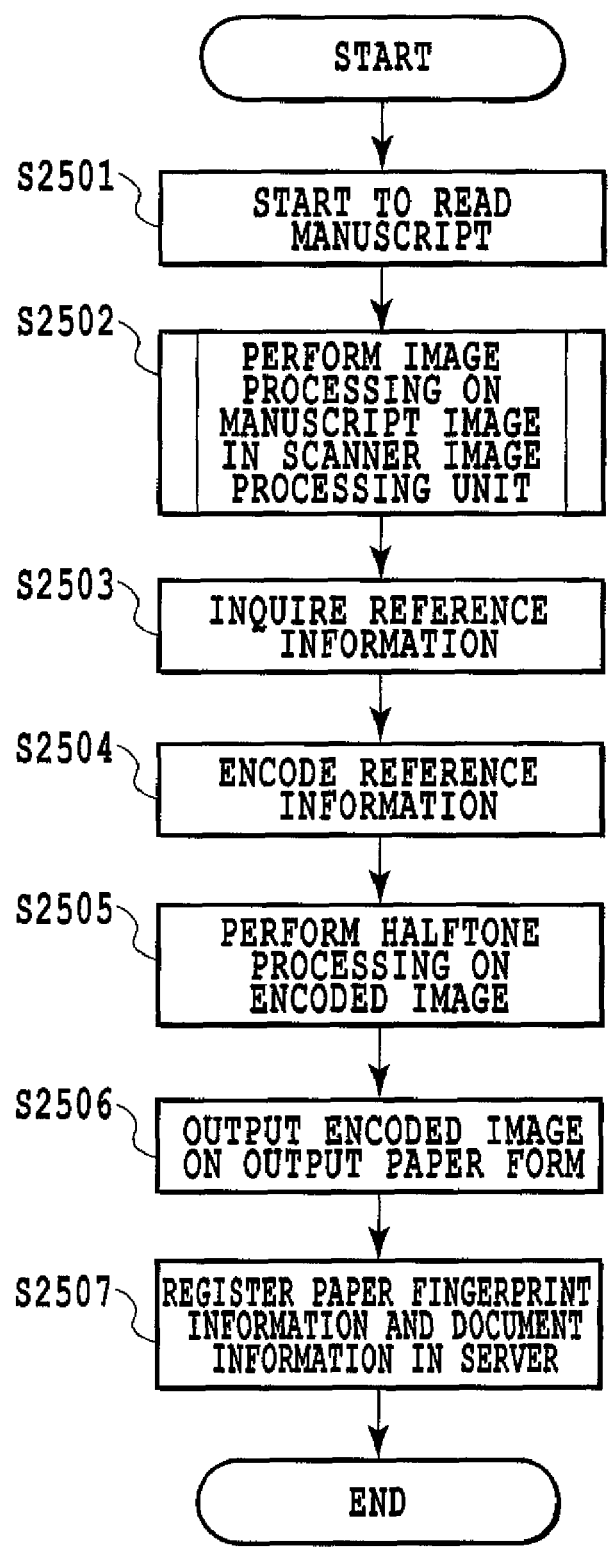
FIG. 25 is a flowchart of the paper fingerprint information registration processing.

FIG. 25 is a flowchart showing a flow of this paper fingerprint information registration processing. The CPU 301 controls steps of this flowchart in an integrated manner.

In step S2501, the scanner 13 is controlled by the CPU 301 so as to send a manuscript read by the scanner 13 to the scanner image processing unit 312 through the scanner I/F 311 as image data.

In Step S2502, two processing steps, i.e., the paper fingerprint information acquisition and the document information acquisition are performed. Details of the processing performed here are the same as those of the processing explained using FIG. 16.

In Step S1601, after setting a general gain adjustment value in the shading correction unit 500, the scanner image processing unit 312 performs processing shown in FIG. 5 on this image data to generate the attribute data together with new image data. Moreover, the scanner image processing unit 312 makes this attribute data accompany the image data. Furthermore, the scanner image processing unit 312 sets a gain adjustment value smaller than the above-mentioned general gain adjustment in the shading correction unit 500. Subsequently, the scanner image processing unit 312 outputs to both the paper fingerprint information acquisition unit 507 and the document information acquisition unit 509 the luminance signal values obtained by applying the smaller gain adjustment value to the image data. Then, in Step S1602, the paper fingerprint information acquisition unit 507 acquires paper fingerprint information based on the output data. Subsequently, the acquired paper fingerprint information is sent to the RAM 302 using an unillustrated data bus.

In Step S1603, after performing the above-mentioned processing, the document information acquisition unit 509 sends the acquired document information to the RAM 302 using an unillustrated data bus. Incidentally, the paper fingerprint information acquisition processing and the document information acquisition processing may be processed in parallel, or may be processed sequentially. Moreover, the image sent to the document information acquisition unit 509 may be an image that was not subjected to the gain adjustment described above and is sent directly from the masking processing unit.

When the processing in Step S2502 of FIG. 25 is completed, processing in Step S2503 will be started.

In Step S2503, as shown in <Encoding processing of reference information>, the CPU 301 inquires the server in order to acquire the index value of the area that should store the paper fingerprint information and document information and acquires the index value.

In Step S2504, the CPU 301 controls in such a way that an encoded image is generated by encoding the reference information that is a combination of the obtained index value and the registered server information and the generated encoded image data is transmitted to the encoded image synthesis unit 607 in the printer image processing unit 315. The reference information is saved in the RAM 302 or the HDD 304.

In Step S2505, the printer image processing unit 315 transmits the encoded image data generated in Step S2504 from the encoded image synthesis unit 607 to the halftone correction unit 606. Subsequently, the halftone correction unit 606 performs the halftone processing on the encoded image data (however, since encoded image data is generated in a binary state at the time of Step S2504, this halftone processing does not alter the encoded image data). The encoded image data after the halftone processing is sent to the printer 14 through the printer I/F 314. In Step S2506, the printer 14 forms an image of the encoded image data on the output paper form.

In Step S2507, as described in <Storing processing of paper fingerprint information and document information in server>, the CPU 301 transmits the paper fingerprint information and document information stored in the HDD 304 or the RAM 302 to the server. The server stores the received paper fingerprint information and document information in an area designated by the index value.

Although in this embodiment, paper fingerprint information registration processing is started by the user pressing the paper fingerprint information registration tab 708 of the operation panel 12, the start is not limited to this and may be done according to a start instruction of the paper fingerprint information registration processing transmitted from the PC 40.

<Operation at the Time of Tab of Paper Fingerprint Information Collation Processing being Pressed>

Next, the paper fingerprint information collation processing performed when the start key is pressed after the user pressed the paper fingerprint information collation tab 709 shown in FIG. 7 will be explained.

Figure 26:
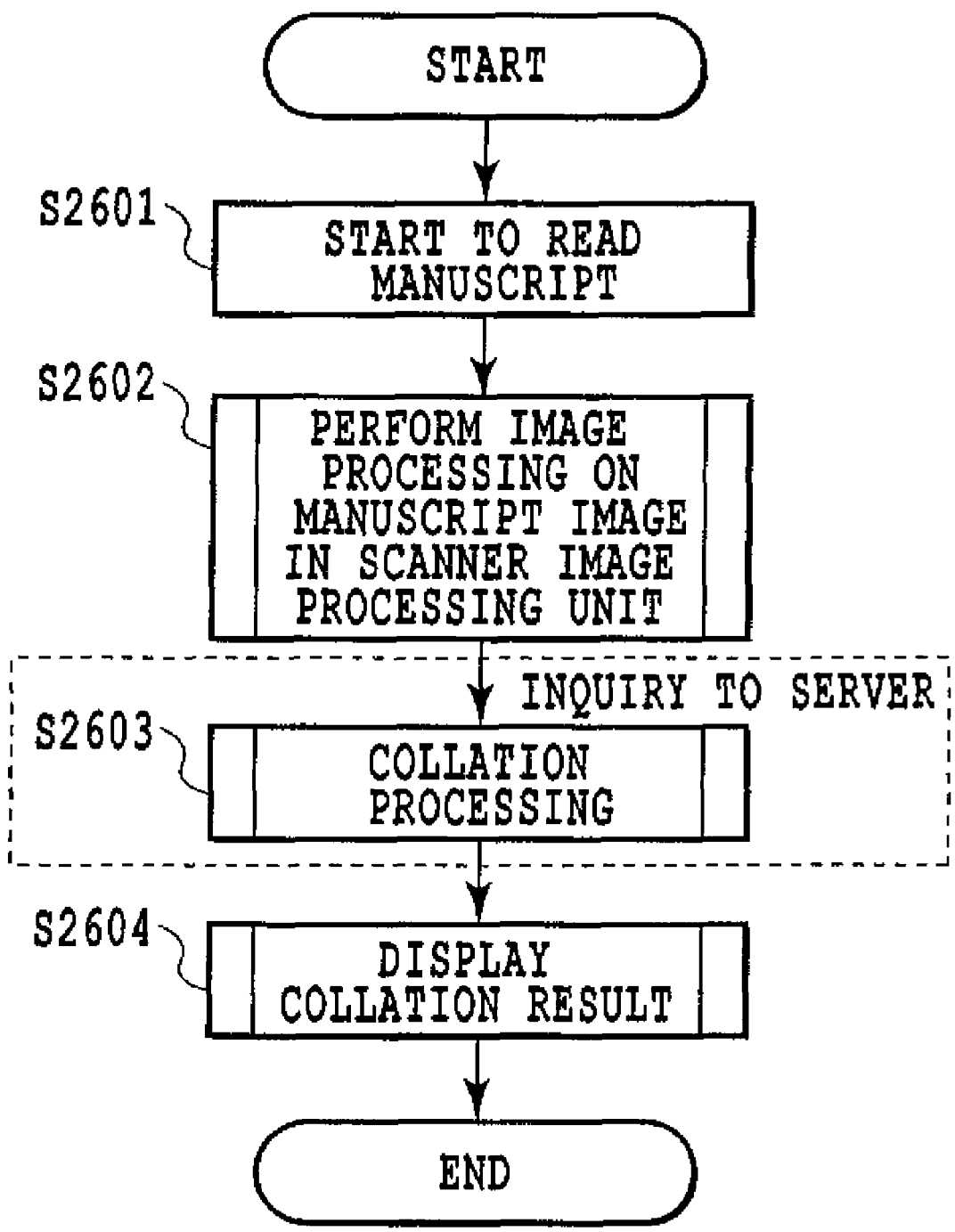
FIG. 26 is a flowchart of the paper fingerprint information collation processing.

FIG. 26 is a flowchart showing this paper fingerprint information collation processing. The CPU 301 controls steps of this flowchart in an integrated manner.

In step 2601, the scanner 13 is controlled by the CPU 301 so as to send a manuscript read by the scanner 13 to the scanner image processing unit 312 through the scanner I/F 311 as image data.

In Step S2602, three processing steps of the paper fingerprint information acquisition processing, the document information acquisition processing, and the decoding processing of encoded image are performed. Details of the processing performed here are the same as those of the processing explained using FIG. 17. Note that what is included in the encoded image is the reference information. The scanner image processing unit 312 performs processing shown in FIG. 5 on this image data and generates the attribute data together with new image data. Moreover, the scanner image processing unit 312 makes this attribute data accompany the image data.

In Step S1701, in order to acquire paper fingerprint information, processing of the gain adjustment of the shading correction unit 500 described above etc. is performed.

In Step S1702, the paper fingerprint information acquisition unit 507 in the scanner image processing unit 312 acquires paper fingerprint information. Subsequently, the acquired paper fingerprint information is sent to the RAM 302 using an unillustrated data bus.

In Step S1703, after the document information acquisition unit 509 in the scanner image processing unit 312 acquired document information and performed predetermined processing, it sends the acquired document information to the RAM 302 using an unillustrated data bus.

Further, in Step S1704, when an encoded image exists, the decode unit 508 in the scanner image processing unit 312 decodes the encoded image, and acquires the reference information included in the encoded image. Subsequently, the decode unit 508 sends the acquired reference information to the RAM 302 using an unillustrated data bus.

Figure 27:
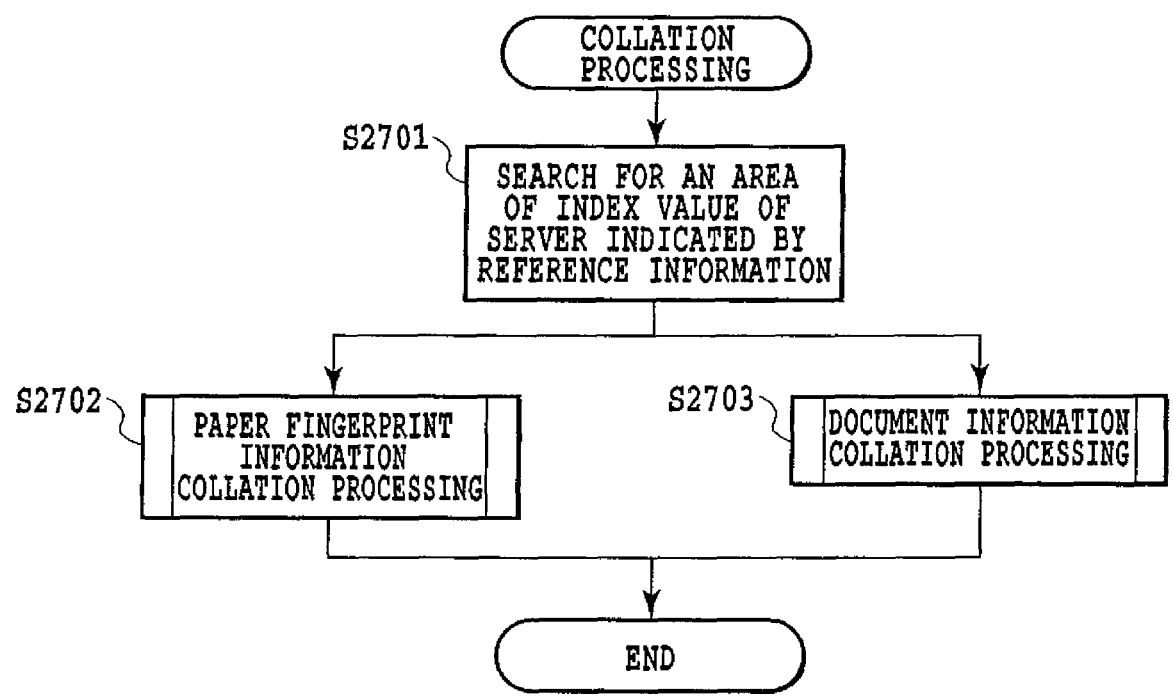
FIG. 27 is a flowchart of original collation processing.

The paper fingerprint information acquisition processing, the document information acquisition processing, and the decoding processing of encoded image may be processed in parallel, or may be processed sequentially. Moreover, the image that is sent to the document information acquisition unit 509 and the decode unit 508 may be an image that was not subjected to the above-mentioned gain adjustment and is directly sent from the masking processing unit In Step S2603 of FIG. 26, as described in <Collation processing of paper fingerprint information and document information in server>, the CPU 301 specifies the server based on the acquired reference information. The CPU 301 transmits the paper fingerprint information and document information stored in the RAM 302 to the specified server, together with the index value included in the reference information. The server performs two processing steps, the paper fingerprint information collation processing and document information collation processing, using the received paper fingerprint information and document information and the paper fingerprint information and document information existing in an area of the table designated by the received index value. FIG. 27 shows a detailed flowchart of the collation processing of the paper fingerprint information and document information performed in Step S2603.

In Step S2701, a server searches a table using the index value, and extracts corresponding paper fingerprint information and document information. In Step S2702, collation processing between the extracted paper fingerprint information and the in-coming paper fingerprint information is performed. Details of the collation processing are as explained in <Paper fingerprint information collation processing> using FIG. 9. On the other hand, in Step S2703, collation processing between the extracted document information and the in-coming document information is performed. Details of the collation processing are as explained in <Document information collation processing> using FIG. 13.

Subsequently, the server transmits results obtained by <Paper fingerprint information collation processing> and <Document information collation processing> to the image processing apparatus.

In Step S2604, the CPU 301 controls in such a way that the operation panel 12 displays the results that were obtained by <Paper fingerprint information collation processing> and <Document information collation processing> and are sent back from the server on its display screen. Details of the processing performed here are the same as those of the processing explained using FIG. 19.

In Step S1901, the CPU 301 determines whether the paper fingerprint information is valid (whether the paper fingerprint information attains matching). Subsequently, in Step S1902 and Step S1903, the CPU 301 determines whether there is tampering in the document information in response to either of the determination results in Step S1901. From the above determination result, the CPU 301 displays as follows in the operation panel 12.

If the paper fingerprint information and document information attain matching, respectively, (S1907) . . . . Display that it can be guaranteed that the manuscript is the original.

If only the paper fingerprint information attains matching (S1906) . . . . Display that its document is tampered.

If only the document information attains matching (S1905) . . . . Display that there is a possibility of the manuscript being a duplicated matter.

If neither the paper fingerprint information nor the document information attains matching (S1904) . . . . Display that there is a possibility of the manuscript being a duplicated matter and that the document is tampered.

Although in this embodiment, the paper fingerprint information collation processing is started by the user pressing the paper fingerprint information collation tab 709 of the operation panel 12, the start is not limited to this and may be done according to a start instruction of the paper fingerprint information collation processing transmitted from the PC 40.

<Flow of Original Reissue when Using Server>

Next, a flow of reissuing the original in the authenticity guarantee when using the server will be explained. A screen display of collation results is the same as FIG. 20 shown in the third embodiment. That is, if it is determined that "in this manuscript, there is a possibility of the document being tampered" (2001), pressing "OK" ends the processing (2003) if the user wishes to know only a collation result. If the user wishes the original reissued, a new original without smudges and additional writing can be issued is by pressing "Reissue" (2002).

<Processing when Reissue Button is Pressed>

Figure 28:
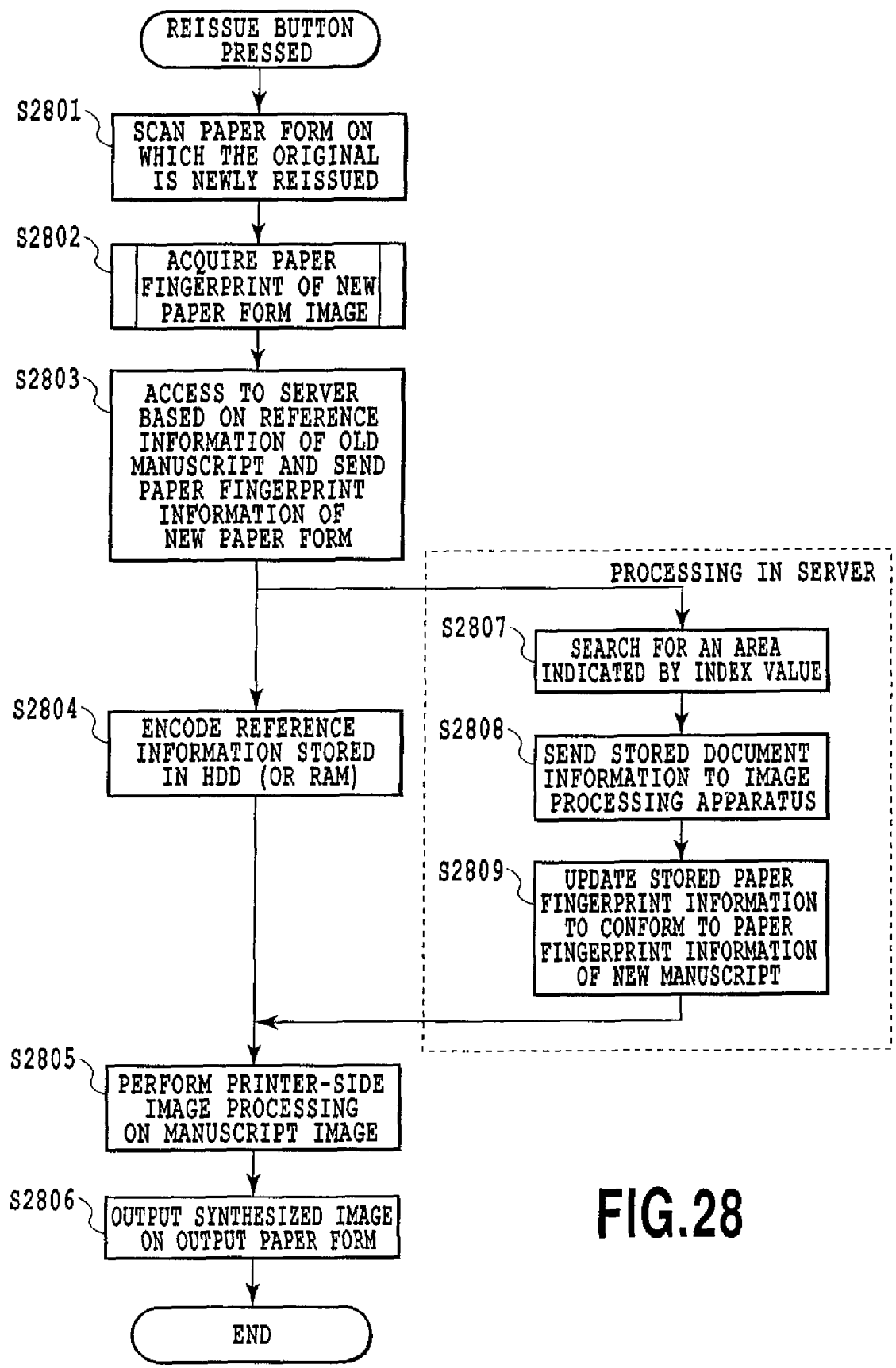
FIG. 28 is a flowchart of the original reissue processing.

FIG. 28 is a flowchart showing a flow of processing when the reissue button is pressed. The CPU 301 controls steps of this flowchart in an integrated manner.

In Step S2801, the scanner 13 is controlled by the CPU 301 so as to send a paper form (a new paper form) on which the original read by the scanner 13 is reissued to the scanner image processing unit 312 through the scanner I/F 311 as image data. In Step S2802, paper fingerprint information acquisition processing is performed on the new paper form. Details of the processing performed here are the same as those of the processing explained using FIG. 8.

That is, the scanner image processing unit 312 sets a general gain adjustment value in the shading correction unit 500 ad performs processing shown in FIG. 5 on this image data to generate new image data. Moreover, the scanner image processing unit 312 sets again adjustment value smaller than the above-mentioned general gain adjustment value in the shading correction unit 500. Subsequently, the scanner image processing unit 312 outputs to the paper fingerprint information acquisition unit 507 the luminance signal values obtained by applying the smaller gain adjustment value to the image data. Then, based on the output data, the paper fingerprint information acquisition unit 507 acquires the paper fingerprint information. Subsequently, the unit 507 sends the acquired paper fingerprint information to the RAM 302 using an unillustrated data bus.

In Step S2803, the CPU 301 reads the decoded data of the encoded image obtained when the old manuscript was scanned from the RAM 302 and accesses to the server based on the reference information included in the decoded data of the old manuscript. In this occasion, the CPU 301 sends the paper fingerprint information of the new paper form obtained in Step S2802 and the index value included in the reference information to the server.

When the processing in Step S2803 is completed, processing in Step S2804 and that in Step S2807 will be started simultaneously.

In Step S2807, the server searches the table for data using the received index value, and specifies corresponding paper fingerprint information and document information.

In Step S2808, the server extracts the specified document information and transmits it to the image processing apparatus. The transmitted document information is sent to the printer image processing unit 315 as image data. The printer image processing unit 315 performs image data editing that accords with the attribute data accompanying the image data. This processing is the processing shown in FIG. 6.

In Step S2809, the server updates the specified paper fingerprint information to the paper fingerprint information of the received new paper form. That is, the server changes the paper fingerprint information corresponding to the above-mentioned index value to the paper fingerprint information of the received new paper form the specified paper fingerprint information.

On the other hand, in Step S2804, the CPU 301 encodes the reference information of the old original stored in either the HDD 304 or the RAM 302.

In Step S2805, the encoded image data generated in Step S2804 and the document information (image data) sent from the server in Step S2808 are synthesized. More specifically, the encoded image synthesis unit 607 synthesizes the image data (of the manuscript) outputted from the output-side gamma correction unit 605 and the encoded image data generated in Step S2804. Subsequently, the halftone correction unit 606 performs the halftone processing on the synthetic image data obtained by the synthesis in conformity to the number of tones of the printer unit for outputting the image. The synthetic image data after the halftone processing is sent to the printer 14 through the printer I/F 314.

In Step S2806, the printer 14 forms an image of the synthesis image data on the output paper form.

In this way, when the reissue button is pressed, a paper form (new paper form) that was scanned in Step S2801 and serves to newly reissue the original is set in the tray 202 again by the user after the scanning. Subsequently, an image of synthetic image data that includes the document information (image data of the manuscript) sent from the server in Step S2808 and the encoded image data formed in Step S2804 is formed on the paper form that is set.

By updating the paper fingerprint information stored in the server and using the document information (image data of the manuscript) and the reference information at the time of original formation, it becomes possible to reissue the original.

Although in this embodiment, paper fingerprint information registration processing is started by the user pressing the paper fingerprint information registration tab 708 of the operation panel 12, the start is not limited to this and may be done according to a start instruction of the paper fingerprint information registration processing transmitted from the PC 40.

Other Embodiment

This invention can be applied to a system that has a plurality of devices (for example, computer, interface devices, reader, printer, etc.) and also to a system made up of one device (integrated device, printer, facsimile apparatus, etc.).

Moreover, the object of this embodiment is attained by the computer (or CPU or MPU) of the system or apparatus reading a program code from a storage medium that stores a program code for realizing the procedure of the flowchart shown in the above-mentioned embodiments and executing it. In this case, the program code itself read from the storage medium will realize the function of the embodiments described above. Therefore, the present invention also includes this program code and the storage medium that stores the program code.

As storage media for storing the program code, for example, there are a floppy (registered trademark) disk, a hard disk, an optical disk, a magneto-optical disk, CD-ROM, CD-R, magnetic tape, a nonvolatile memory card, ROM, etc.

Moreover, the present invention also includes a case where, based on instructions of the program code that the computer read, OS (operating system) etc. working on a computer performs a part or the whole of processing and thereby the function of the embodiment described above is attained.

Moreover, this invention also includes a case where, based on instructions of the program code read from a storage medium and written in memory that is provided in a function expansion board or function expansion unit connected to the computer, the CPU provided therein or the like executes a part or the whole of the processing.

Incidentally, the embodiments may include a case where a plurality of acquisition means are included. In such a case, these acquisition means may be called "first acquisition means", "second acquisition means", and a "third acquisition means".

Moreover, the embodiments may include a case where a plurality of information collation means are included. In such a case, a plurality of collation means may be called "first collating means" and "second collating means".

In the above-embodiment, I disclose the technology that acquires the fingerprint information and the document information from the paper form that is to be an original.

However, the object can be attained if the fingerprint information and the document information from an original (the paper form that has been an original) is acquired.

In addition, the paper form in the above-embodiment is also called paper because the paper form doesn't have any other feature except that the paper form is a paper.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-187002, filed Jul. 6, 2006 and No. 2007-145744, filed May 31, 2007, which is hereby incorporated by reference herein in their entirety.

What is claimed is:

1. An image processing apparatus, comprising:
   first acquisition means for acquiring paper fingerprint information and document information from an encoded image in a manuscript;
   second acquisition means for acquiring paper fingerprint information from a paper fingerprint acquisition area in the manuscript;
   third acquisition means for acquiring document information from a document information acquisition area in the manuscript;
   first collation means for collating the paper fingerprint information acquired by said first acquisition means and the paper fingerprint information acquired by said second acquisition means;
   second collation means for collating the document information acquired by said first acquisition means and the document information acquired by said third acquisition means; and
   determination means for determining whether said manuscript is an original from the collation results of said first collation means and said second collation means;
   wherein the first collation means determines a similarity between the paper fingerprint information acquired by said first acquisition means and the paper fingerprint information acquired by said second acquisition means by using the following formula $$E = \frac{\sum_{x,y} \alpha_1(x, y)\alpha_2(x, y)\{f_1(x, y) - f_2(x, y)\}^2}{\sum_{x,y} \alpha_1(x, y)\alpha_2(x, y)}$$

where $\alpha_1$ is a mask data of the paper fingerprint information acquired by said first acquisition means, $f_1$ is a gray-scale data of the paper fingerprint information acquired by said first acquisition means, $\alpha_2$ is a mask data of the paper fingerprint information acquired by said second acquisition means, and $f_2$ is a gray-scale data of the paper fingerprint information acquired by said second acquisition means.

2. The image processing apparatus according to claim 1, further comprising reissue means for, when said determination means does not determine that said manuscript is the original, reissuing the original.

3. The image processing apparatus according to claim 2, wherein said reissue means outputs said document information on a new paper form, and the paper fingerprint information of said new paper form is considered as paper fingerprint information of the original instead of said paper fingerprint information.

4. An image processing method, comprising:
   a first acquisition step of acquiring paper fingerprint information and document information from an encoded image in a manuscript;
   a second acquisition step of acquiring paper fingerprint information from a paper fingerprint acquisition area in the manuscript;
   a third acquisition step of acquiring document information from a document information acquisition area in the manuscript;
   a first collation step of using an image processing apparatus to collate the paper fingerprint information acquired in said first acquisition step and the paper fingerprint information acquired in said second acquisition step;
   a second collation step of using the image processing apparatus to collate the document information acquired in said first acquisition step and the document information acquired in said third acquisition step; and
   a determination step of determining, by the image processing apparatus, whether said manuscript is the original from collation results of said first collation step and said second collation step;
   wherein the first collation step comprises a step of determining a similarity between the paper fingerprint information acquired by said first acquisition step and the paper fingerprint information acquired by said second acquisition step by using the following formula $$E = \frac{\sum_{x,y} \alpha_1(x, y)\alpha_2(x, y)\{f_1(x, y) - f_2(x, y)\}^2}{\sum_{x,y} \alpha_1(x, y)\alpha_2(x, y)}$$

where $\alpha_1$ is a mask data of the paper fingerprint information acquired by said first acquisition step, $f_1$ is a gray-scale data of the paper fingerprint information acquired by said first acquisition step, $\alpha_2$ is a mask data of the paper fingerprint information acquired by said second acquisition step, and $f_2$ is a gray-scale data of the paper fingerprint information acquired by said second acquisition step.

5. A non-transitory computer-readable storage medium for storing a program that executes the image processing method according to claim 4.

6. The image processing method according to claim 4, further comprising a reissue step of, when said manuscript is not determined that it is the original in said determination step, reissuing the original.

7. A non-transitory computer-readable storage medium for storing a program that executes the image processing method according to claim 6.

8. The image processing method according to claim 6, wherein in said reissue step, said document information is outputted on a new paper form, and the paper fingerprint information of said new paper form is considered as paper fingerprint information of the original instead of said paper fingerprint information.

9. A non-transitory computer-readable storage medium for storing a program that executes the image processing method according to claim 8.

* * * * *